United States Patent
Cai et al.

(10) Patent No.: US 11,368,974 B2
(45) Date of Patent: Jun. 21, 2022

(54) CONTROL INFORMATION PROCESSING METHOD AND SYSTEM, FIRST DEVICE, AND SECOND DEVICE

(71) Applicant: HUAWEI TECHNOLOGIES CO., LTD., Guangdong (CN)

(72) Inventors: Yu Cai, Beijing (CN); Yongbo Zeng, Beijing (CN); Da Wang, Shenzhen (CN); Jian Wang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 122 days.

(21) Appl. No.: 16/756,168

(22) PCT Filed: May 17, 2018

(86) PCT No.: PCT/CN2018/087215
§ 371 (c)(1),
(2) Date: Apr. 15, 2020

(87) PCT Pub. No.: WO2019/080486
PCT Pub. Date: May 2, 2019

(65) Prior Publication Data
US 2020/0252957 A1 Aug. 6, 2020

(30) Foreign Application Priority Data
Oct. 27, 2017 (CN) .......................... 201711023630.0

(51) Int. Cl.
*H04W 72/12* (2009.01)
*H04W 72/04* (2009.01)

(52) U.S. Cl.
CPC ... *H04W 72/1289* (2013.01); *H04W 72/0446* (2013.01)

(58) Field of Classification Search
CPC .................. H04W 72/1289; H04W 72/0446
(Continued)

(56) References Cited

U.S. PATENT DOCUMENTS

| 2016/0234754 A1 | 8/2016 | Baghel |
| 2017/0359835 A1 | 12/2017 | Seo et al. |
| 2020/0084792 A1* | 3/2020 | Khoryaev ......... H04W 72/1289 |

FOREIGN PATENT DOCUMENTS

| CA | 2874463 A1 | 1/2014 |
| CN | 102083226 A | 6/2011 |

(Continued)

OTHER PUBLICATIONS

R1-1712918 ZTE,"Resource scheme of FeD2D Relay",3GPP TSG RAN WG1 Meeting #90,Prague, Czech Republic, Aug. 21-25, 2017,total 5 pages.

(Continued)

*Primary Examiner* — Peter G Solinsky
(74) *Attorney, Agent, or Firm* — Westerman, Hattori, Daniels & Adrian, LLP

(57) ABSTRACT

A control information processing method and system includes: receiving, by a first device, first control information sent by a network device; determining, by the first device based on first information, that the first control information is used to schedule a target device, where the target device is one of the first device and at least one second device. The first information is related to the first control information. When the target device is at least one second device, determining, by the first device, second control information based on resource information that is used for data transmission and that is included in the first control information, and sending the second control information to the target device, so that the target device transmits data based on the second control information. When the target device is the first device, transmitting, by the first device, data based on the first control information.

15 Claims, 6 Drawing Sheets

(58) Field of Classification Search
USPC .......................................................... 370/329
See application file for complete search history.

(56) References Cited

FOREIGN PATENT DOCUMENTS

| | | | |
|---|---|---|---|
| CN | 104066194 | A | 9/2014 |
| CN | 104335639 | A | 2/2015 |
| CN | 105792368 | A | 7/2016 |
| CN | 107113538 | A | 8/2017 |
| CN | 107211338 | A | 9/2017 |
| WO | 2013/034107 | A1 | 3/2013 |
| WO | 2014/187174 | A1 | 11/2014 |
| WO | 2016182601 | A1 | 11/2016 |

OTHER PUBLICATIONS

Extended Search Report dated Oct. 6, 2020, issued in counterpart EP Application No. 18870713.7 (12 pages).
International Search Report dated Jul. 30, 2018, issued in counterpart application No. PCT/CN2018/087215, with English translation. (17 pages).
Office Action dated Mar. 19, 2020, issued in counterpart JP application No. 201711023630.0, with English translation (34 pages).

* cited by examiner

CONTROL INFORMATION PROCESSING METHOD AND SYSTEM, FIRST DEVICE, AND SECOND DEVICE

CROSS-REFERENCE TO RELATED APPLICATIONS

This application is a National Stage of International Patent Application No. PCT/CN2018/087215 filed on May 17, 2018, which claims priority to Chinese Patent Application No. 201711023630.0, filed on Oct. 27, 2017. Both of the aforementioned applications are hereby incorporated by reference in their entireties.

TECHNICAL FIELD

The present invention relates to the field of communications technologies, and in particular, to a control information processing method and system, a first device, and a second device.

BACKGROUND

A device-to-device (D2D) communication mode is a communication mode in which a transmit end directly sends data to a receive end through a side link, with no need to be forwarded by using a network device such as an evolved base station (evolved Node B, eNB).

In a relatively special manner of D2D communication, remote user equipment (UE) is connected to the network device by using other relay user equipment (relay UE) that has a relay function, and this scenario is referred to as UE-to-network relay.

In practice, the network device may send downlink control information (DCI) to UE. The control information includes resource information used by the UE to send data or receive data. In the UE-to-network relay scenario, the relay UE receives DCI for the relay UE and DCI for the remote UE connected to the relay UE. However, how the relay UE determines which UE is scheduled by using the DCI is still a problem worthy of consideration.

SUMMARY

Embodiments of the present invention are to resolve a technical problem about how to determine which UE is scheduled by using first control information, and provide a control information processing method and system, a first device, and a second device. The first device can determine, by using first information related to the first control information, a device scheduled by using the first control information.

According to a first aspect, an embodiment of the present invention provides a control information processing method, including:

receiving, by a first device, first control information sent by a network device; determining, based on first information, that the first control information is used to schedule a target device, where the target device is one of the following devices: the first device and at least one second device, the at least one second device communicates with the network device by using the first device, and the first information includes at least one of the following: the first control information, a radio network temporary identifier for scrambling the first control information, a payload size of the first control information, a PDCCH that carries the first control information, and a subframe in which the first control information is located; and when the target device is one of the at least one second device, determining, by the first device, second control information based on resource information that is used for data transmission and that is included in the first control information, and sending the second control information to the target device, so that the target device transmits data based on the second control information; or when the target device is the first device, transmitting, by the first device, data based on the first control information.

Optionally, the resource information used for data transmission includes at least one of frequency domain information of a resource and time domain information of the resource.

According to the first aspect, after receiving the first control information sent by the network device, the first device can determine, based on the first information related to the first control information, which one of the first device and the at least one second device is scheduled by using the first control information.

In an optional implementation, the first control information includes first indication information; and the determining, by the first device based on first information, that the first control information is used to schedule a target device is specifically: determining, based on the first indication information included in the first control information, that the first control information is used to schedule the target device. In this case, the first indication information is in a one-to-one correspondence with device identities, and the device identity herein includes an identity of the first device and an identity of each of the at least one second device.

In an optional implementation, the first control information includes second indication information; and the determining, by the first device based on first information, that the first control information is used to schedule a target device is specifically as follows:

A first possible solution is determining, based on the radio network temporary identifier for scrambling the first control information and the second indication information included in the first control information, that the first control information is used to schedule the target device. Optionally, in specific implementation, the first device determines, based on a mapping relationship between a radio network temporary identifier and a device identity and a mapping relationship between indication information and a device identity, a target device identity corresponding to both the radio network temporary identifier for scrambling the first control information and the second indication information included in the first control information, and determines that the first control information is used to schedule a target device indicated by the target device identity. The device identity includes an identity of the first device and an identity of each of the at least one second device.

Alternatively, a second possible solution is determining, by the first device based on the radio network temporary identifier for scrambling the first control information and the subframe in which the first control information is located, that the first control information is used to schedule the target device. Optionally, in specific implementation, the first device determines, based on a mapping relationship between a radio network temporary identifier and a device identity and a mapping relationship between a subframe in which control information is located and a device identity, a target device identity corresponding to both the radio network temporary identifier for scrambling the first control information and the subframe in which the first control information is located, and determines that the first control information is used to schedule a target device indicated by the target device identity. The device identity includes an identity of the first device and an identity of each of the at least one second device.

Alternatively, a third possible solution is determining, by the first device based on the second indication information included in the first control information and the subframe in which the first control information is located, that the first control information is used to schedule the target device. Optionally, in specific implementation, the first device determines, based on a mapping relationship between indication information and a device identity and a mapping relationship between a subframe in which control information is located and a device identity, a target device identity corresponding to both the second indication information and the subframe in which the first control information is located, and determines that the first control information is used to schedule a target device indicated by the target device identity. The device identity includes an identity of the first device and an identity of each of the at least one second device.

Alternatively, a fourth possible solution is determining, by the first device based on the radio network temporary identifier for scrambling the first control information and the PDCCH that carries the first control information, that the first control information is used to schedule the target device. Optionally, in specific implementation, the first device determines, based on a mapping relationship between a radio network temporary identifier and a device identity and a mapping relationship between a PDCCH that carries control information and a device identity, a target device identity corresponding to both the radio network temporary identifier for scrambling the first control information and the PDCCH that carries the first control information, and determines that the first control information is used to schedule a target device indicated by the target device identity. The device identity includes an identity of the first device and an identity of each of the at least one second device.

Optionally, the aforementioned mapping relationships and mapping relationships in other possible implementation solutions that are not exemplified one by one may be notified by the network device to the first device, so that the first device determines UE scheduled by using the first control information.

According to a second aspect, an embodiment of the present invention provides a control information processing method, including:

detecting, by a second device, first control information sent by a network device; determining, by the second device based on first information, that the first control information is used to schedule the second device, where the first information includes at least one of the following: a payload size of the first control information, a PDCCH that carries the first control information, and a subframe in which the first control information is located; and transmitting, by the second device, data based on the first control information.

In the second aspect, after receiving the first control information sent by the network device, the second device can determine, based on the first information related to the first control information, whether the first control information is used to schedule the second device.

In an optional implementation, the first information further includes at least one of the first control information and a radio network temporary identifier for scrambling the first control information.

In an optional implementation, the first control information includes first indication information; and the determining, by the second device based on first information, that the first control information is used to schedule the second device is specifically as follows:

A first possible solution is determining, based on the radio network temporary identifier for scrambling the first control information and the first indication information included in the first control information, that the first control information is used to schedule the second device. Optionally, in specific implementation, the second device determines a target radio network temporary identifier and target indication information; and when the radio network temporary identifier for scrambling the first control information is the target radio network temporary identifier, and second indication information is the target indication information, the second device determines that the first control information is used to schedule the second device.

Alternatively, a second possible solution is determining, by the second device based on the radio network temporary identifier for scrambling the first control information and the subframe in which the first control information is located, that the first control information is used to schedule the second device. Optionally, in specific implementation, the second device determines a target radio network temporary identifier and a target subframe set, where the target subframe set includes at least one target subframe; and when the radio network temporary identifier for scrambling the first control information is the target radio network temporary identifier, and the subframe in which the first control information is located belongs to the target subframe set, the second device determines that the first control information is used to schedule the second device.

Alternatively, a third possible solution is determining, by the second device based on the first indication information included in the first control information and the subframe in which the first control information is located, that the first control information is used to schedule the second device. Optionally, in specific implementation, the second device determines target indication information and a target subframe set, where the target subframe set includes at least one target subframe; and when the first indication information included in the first control information is the target indication information, and the subframe in which the first control information is located belongs to the target subframe set, the second device determines that the first control information is used to schedule the second device.

Alternatively, a fourth possible solution is determining, by the second device based on the radio network temporary identifier for scrambling the first control information and the PDCCH that carries the first control information, that the first control information is used to schedule the second device. Optionally, in specific implementation, the second device determines a target radio network temporary identifier and a target PDCCH set, where the target PDCCH set includes at least one target PDCCH; and when the radio network temporary identifier for scrambling the first control information is the target radio network temporary identifier, and the PDCCH that carries the first control information belongs to the target PDCCH set, the second device determines that the first control information is used to schedule the second device.

According to a third aspect, an embodiment of the present invention provides a control information processing method, including:

receiving, by a first device, first control information sent by a network device; and determining, by the first device based on first information, that the first control information is used to schedule a first-type device or a second-type device, where the first-type device is the first device, and the second-type device includes at least one second device; the at least one second device communicates with the network device by using the first device; and the first information includes: first indication information included in the first control information, a radio network temporary identifier for scrambling the first control information, a payload size of the first control information, a PDCCH that carries the first control information, or a subframe in which the first control information is located.

In the third aspect, after receiving the first control information sent by the network device, the first device can determine, based on the first information related to the first control information, a type of device scheduled by using the first control information.

In an optional implementation, the method further includes: when the first control information is used to schedule the first-type device, transmitting, by the first device, data based on the first control information.

In an optional implementation, the method further includes: when the first control information is used to schedule the second-type device, determining, by the first device, that the first control information is used to schedule a target device, where the target device is one of the at least one second device included in the second-type device; and determining, by the first device, second control information based on resource information that is used for data transmission and that is included in the first control information, and sending the second control information to the target device, so that the target device transmits data based on the second control information. In this way, when the first device determines that the second-type device that includes the at least one second device is to be scheduled, the first device can continue to determine which one of the at least one second device is scheduled by using the first control information.

In an optional implementation, the determining, by the first device, that the first control information is used to schedule a target device is specifically:

determining, by the first device based on second information, that the first control information is used to schedule the target device, where the second information includes at least one of the following: second indication information included in the first control information, the radio network temporary identifier for scrambling the first control information, the payload size of the first control information, the PDCCH that carries the first control information, or the subframe in which the first control information is located.

In an optional implementation, the determining, by the first device based on second information, that the first control information is used to schedule the target device is specifically as follows:

A first possible solution is determining, based on the radio network temporary identifier for scrambling the first control information and the second indication information included in the first control information, that the first control information is used to schedule the target device. Optionally, in specific implementation, the first device determines, based on a mapping relationship between a radio network temporary identifier and a device identity and a mapping relationship between indication information and a device identity, a target device identity corresponding to both the radio network temporary identifier for scrambling the first control information and the second indication information included in the first control information, and determines that the first control information is used to schedule a target device indicated by the target device identity. The device identity includes an identity of each of the at least one second device.

Alternatively, a second possible solution is determining, by the first device based on the radio network temporary identifier for scrambling the first control information and the subframe in which the first control information is located, that the first control information is used to schedule the target device. Optionally, in specific implementation, the first device determines, based on a mapping relationship between a radio network temporary identifier and a device identity and a mapping relationship between a subframe in which control information is located and a device identity, a target device identity corresponding to both the radio network temporary identifier for scrambling the first control information and the subframe in which the first control information is located, and determines that the first control information is used to schedule a target device indicated by the target device identity. The device identity includes an identity of each of the at least one second device.

Alternatively, a third possible solution is determining, by the first device based on the second indication information included in the first control information and the subframe in which the first control information is located, that the first control information is used to schedule the target device. Optionally, in specific implementation, the first device determines, based on a mapping relationship between indication information and a device identity and a mapping relationship between a subframe in which control information is located and a device identity, a target device identity corresponding to both the second indication information and the subframe in which the first control information is located, and determines that the first control information is used to schedule a target device indicated by the target device identity. The device identity includes an identity of each of the at least one second device.

Alternatively, a fourth possible solution is determining, by the first device based on the radio network temporary identifier for scrambling the first control information and the PDCCH that carries the first control information, that the first control information is used to schedule the target device. Optionally, in specific implementation, the first device determines, based on a mapping relationship between a radio network temporary identifier and a device identity and a mapping relationship between a PDCCH that carries control information and a device identity, a target device identity corresponding to both the radio network temporary identifier for scrambling the first control information and the PDCCH that carries the first control information, and determines that the first control information is used to schedule a target device indicated by the target device identity. The device identity includes an identity of each of the at least one second device.

Optionally, the aforementioned mapping relationships and mapping relationships in other possible implementation solutions that are not exemplified one by one may be notified by the network device to the first device, so that the first device determines UE scheduled by using the first control information.

In an optional implementation, when the first information is the PDCCH that carries the first control information, the determining, by the first device based on first information, that the first control information is used to schedule a first-type device or a second-type device is specifically: determining, by the first device based on a mapping relationship between a PDCCH that carries control information and a device type, a target device type corresponding to the PDCCH that carries the first control information, and determining that the first control information is used to schedule a type of device indicated by the target device type, where the device type includes the first-type device and the second-type device. In this way, the first device can determine a device type scheduled by using the first control information.

In an optional implementation, when the first information is the subframe in which the first control information is located, the determining, by the first device based on first information, that the first control information is used to schedule a first-type device or a second-type device is specifically: determining, by the first device based on a mapping relationship between a subframe in which control information is located and a device type, a target device type corresponding to the subframe in which the first control information is located, and determining that the first control information is used to schedule a type of device indicated by the target device type, where the device type includes the first-type device and the second-type device. In this way, the first device can determine a device type scheduled by using the first control information.

According to a fourth aspect, an embodiment of the present invention provides a control information processing method, including:

determining, by a network device, resource information used by a target device for data transmission; and sending, by the network device based on first information corresponding to the target device, first control information used to schedule the target device, where the first control information includes the resource information, and the first information includes at least one of the following: indication information included in the first control information, a radio network temporary identifier used to scramble the first control information, a payload size of the first control information, a PDCCH that carries the first control information, and a subframe in which the first control information is located.

In the fourth aspect, the network device may send, based on the first information that is related to the first control and that corresponds to the target device, the first control information for scheduling the device by a user. In this way, after receiving the first control information, another device can determine, based on the first information, which device is scheduled by using the first control information.

In an optional implementation, the target device is any one of a first device and at least one second device, and the at least one second device communicates with the network device by using the first device.

In an optional implementation, the sending, by the network device based on first information corresponding to the target device, first control information used to schedule the target device is specifically:

adding second indication information to the first control information, scrambling the first control information by using a radio network temporary identifier corresponding to the target device, and sending the first control information used to schedule the target device;

scrambling the first control information by using a radio network temporary identifier corresponding to the target device, and sending, in a target subframe in a target subframe set corresponding to the target device, the first control information used to schedule the target device;

adding second indication information to the first control information, and sending, in a target subframe in a target subframe set corresponding to the target device, the first control information used to schedule the target device; or scrambling the first control information by using a radio network temporary identifier corresponding to the target device, and sending, on a target PDCCH in a target PDCCH set, the first control information used to schedule the target device.

According to a fifth aspect, an embodiment of the present invention provides a first device. The first device includes a processor and a transceiver. Optionally, the first device further includes a memory. The processor is connected to the memory and the transceiver. For example, the processor may be connected to the memory and the transceiver by using a bus. The transceiver is configured to communicate with another device such as a second device or a network device. The memory is configured to store, for example, information about network slicing. The processor is configured to perform some or all of the procedures in the first aspect or the third aspect.

According to a sixth aspect, an embodiment of the present invention provides another first device. The first device includes a transceiver module and a processing module, and the transceiver module is configured to implement the transceiver in the fifth aspect. The first device implements a part or all of the method in the first aspect or the third aspect by using the foregoing units.

According to a seventh aspect, an embodiment of the present invention provides a second device. The second device includes a processor and a transceiver. Optionally, the second device further includes a memory. The processor is connected to the memory and the transceiver. For example, the processor may be connected to the memory and the transceiver by using a bus. The transceiver is configured to communicate with another device such as a first device or a network device. The memory is configured to store, for example, information about network slicing. The processor is configured to perform some or all of the procedures of the second aspect.

According to an eighth aspect, an embodiment of the present invention provides another second device. The second device includes a transceiver module and a processing module, and the transceiver module is configured to implement the transceiver in the seventh aspect. The second device implements a part or all of the method in the second aspect by using the foregoing units.

According to a ninth aspect, an embodiment of the present invention provides a network device. The network device includes a processor and a transceiver. Optionally, the network device further includes a memory. The processor is connected to the memory and the transceiver. For example, the processor may be connected to the memory and the transceiver by using a bus. The transceiver is configured to communicate with another device such as a first device or a second device. The memory is configured to store, for example, information about network slicing. The processor is configured to perform some or all of the procedures of the eighth aspect.

According to a tenth aspect, an embodiment of the present invention provides another network device. The network device includes a transceiver module and a processing module, and the transceiver module is configured to implement the transceiver in the ninth aspect. The network device implements a part or all of the method in the fourth aspect by using the foregoing units.

According to an eleventh aspect, a computer program product is provided. The computer program product includes computer program code. When the computer program code is nm on a computer, the computer is enabled to perform the method in any one of the first aspect to the fourth aspect and the possible implementations of the first aspect to the fourth aspect.

According to a twelfth aspect, a computer readable medium is provided. The computer readable medium stores program code. When the computer program code is run on a computer, the computer is enabled to perform the method in any one of the first aspect to the fourth aspect and the possible implementations of the first aspect to the fourth aspect.

According to a thirteenth aspect, a control information processing system is provided, where the control information processing system includes a first device and at least one second device, the at least one second device communicates with a network device by using the first device, and the system includes:

receiving, by the first device, first control information sent by the network device;

determining, by the first device based on first information, that the first control information is used to schedule a target device, where the target device is one of the following devices: the first device and the at least one second device, and the first information includes at least one of the following: the first control information, a radio network temporary identifier for scrambling the first control information, a payload size of the first control information, a PDCCH that carries the first control information, and a subframe in which the first control information is located; and when the target device is one of the at least one second device, determining, by the first device, second control information based on resource information that is used for data transmission and that is included in the first control information, and sending the second control information to the target device; and receiving, by the target device, the second control information, and transmitting data based on the second control information; or when the target device is the first device, transmitting, by the first device, data based on the first control information.

In an optional implementation, the first device in the system may perform the method in any one of the first aspect and the possible implementations of the first aspect.

According to a fourteenth aspect, a control information processing system is provided, where the control information processing system includes a first-type device and a second-type device, the first-type device is a first device, the second-type device includes at least one second device, the at least one second device communicates with a network device by using the first device, and the system includes:

receiving, by the first device, first control information sent by the network device;

determining, by the first device based on first information, that the first control information is used to schedule the first-type device or the second-type device, where the first information includes: first indication information included in the first control information, a radio network temporary identifier for scrambling the first control information, a payload size of the first control information, a PDCCH that carries the first control information, or a subframe in which the first control information is located; and when the first control information is used to schedule the second-type device, determining, by the first device, that the first control information is used to schedule a target device, where the target device is one of the at least one second device included in the second-type device; determining, by the first device, second control information based on resource information that is used for data transmission and that is included in the first control information, and sending the second control information to the target device; and receiving, by the target device, the second control information, and transmitting data based on the second control information; or when the first control information is used to schedule the first-type device, transmitting, by the first device, data based on the first control information.

In an optional implementation, the first device in the system may perform the method in any one of the third aspect and the possible implementations of the third aspect.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

Figure 1:
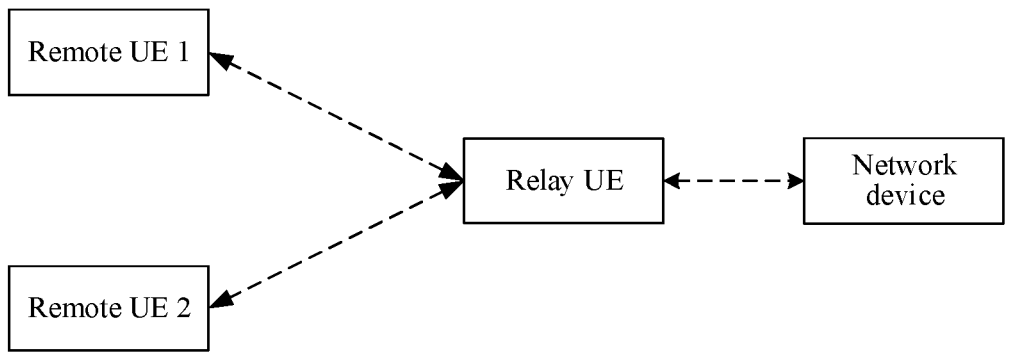
FIG. 1 shows a system architecture of a UE-to-network relay scenario according to an embodiment of the present invention.

The following describes the embodiments of the present invention with reference to the accompanying drawings in the embodiments of the present invention.

Network elements in the embodiments of the present invention are described as follows:

A network device may be an access network (radio access network, RAN) device and is mainly responsible for functions such as radio resource management, quality of service (QoS) management, data compression, and data encryption on an air interface side. The network device may include base stations in various forms, such as a macro base station, a micro base station (also referred to as a small cell), a relay node, and an access point. In systems using different radio access technologies, devices having a function of a base station may have different names. For example, in a fifth-generation (5G) system, the device is referred to as a gNB; in an LTE system, the device is referred to as an evolved node B (eNB or eNodeB); and in a third-generation (3G) system, the device is referred to as a node B.

In the embodiments of the present invention, remote user equipment or relay user equipment may be referred to as a terminal device, or may be referred to as user equipment (UE). The UE accesses a network side by using an access network device, for example, the UE may be a handheld terminal device, a notebook computer, a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, or a machine type communication (MTC) terminal. For example, the terminal device may alternatively be a portable, pocket-sized, handheld, computer-embedded, or in-vehicle mobile apparatus.

For example, the remote user equipment may be a low-capability device, for example, a wearable device. The remote user equipment is characterized by a small size, a small battery capacity, and a relatively low radio frequency capability. Therefore, power consumed by the remote user equipment needs to be reduced, to prolong a standby time of the remote user equipment. The relay user equipment may be a high-capability device, for example, a high-capability smartphone, and may be used as a relay node to assist a low-capability device to connect to a network, so as to reduce power consumption of the low-capability device. For example, in the future, people wear various intelligent wearable devices. These devices need to be connected to the network to transmit data or establish a voice telephone service. Because a distance between a wearable device and a smartphone is far less than a distance between the wearable device and a base station, if these devices can be connected to the network by using the smartphone in a relay manner, power consumption of the wearable device can be reduced, and a transmission rate of the wearable device can be increased.

Optionally, a resource allocation method in the embodiments of the present invention is applicable to a UE-to-network relay scenario in a D2D communications system. D2D communication is a communication mode in which a transmit end directly sends data to a receive end through a side uplink, with no need to be forwarded by using an eNB or a cellular network. The UE-to-network relay scenario is a relatively special manner of D2D communication.

FIG. 1 shows a system architecture of a UE-to-network relay scenario according to an embodiment of the present invention. As shown in the figure, the system architecture includes a network device, relay UE, and remote UE. The remote UE is connected to the network device by using the relay TIE, so as to access a network. It should be noted that FIG. 1 shows only two remote UEs, but this does not constitute a limitation on this embodiment of the present invention. A quantity of remote UEs is not limited in this embodiment of the present invention.

Based on a system architecture diagram in FIG. 1, the network device may allocate resources to the relay UE and the remote UE. If a resource is allocated to the relay UE, the relay UE may send data or receive data based on the allocated resource. For example, the resource is a resource required by the relay TIE to send data to the remote UE, a resource required by the relay UE to receive data sent by the remote UE, a resource required by the relay UE to send data to the network device, or a resource required by the relay UE to receive data sent by the network device. If a resource is allocated to the remote UE, the remote UE may send data or receive data based on the allocated resource. For example, the resource is a resource required by the remote UE to send data to the relay UE, a resource required by the remote UE to receive data sent by the relay UE, a resource required by the remote UE to send data to the network device, or a resource required by the remote UE to receive data sent by the network device.

An existing resource allocation method includes: allocating, by a network device, resources to relay UE and remote UE by using downlink control information (DCI). A resource allocation field in the DCI may indicate information about a resource allocated to UE. However, in a scenario in which at least one remote UE communicates with a network device by using relay UE, the network device may send DCI to schedule the relay UE or send DCI to schedule the remote UE. For the relay UE, the DCI used to schedule the relay UE or the DCI used to schedule the remote UE needs to be detected, and how to determine whether the DCI is used to schedule the relay UE or the remote UE is still a problem worthy of consideration. For the remote UE, how to detect the DCI used to schedule the remote UE is still a problem worthy of consideration.

In a first optional implementation solution, in this embodiment of the present invention, the relay UE receives first control information sent by the network device; the relay UE determines, based on first information, that the first control information is used to schedule a target device, where the target device is one of the following devices: the relay UE and the at least one remote UE, the at least one remote UE communicates with the network device by using the relay UE, and the first information includes at least one of the following: the first control information, a radio network temporary identifier for scrambling the first control information, a payload size of the first control information, a PDCCH that carries the first control information, and a subframe in which the first control information is located; and when the target device is one of the at least one remote UE, the relay UE determines second control information based on resource information that is used for data transmission and that is included in the first control information, and sends the second control information to the target device, so that the target device transmits data based on the second control information; or when the target device is the relay UE, the relay UE transmits data based on the first control information. In this way, after receiving the first control information sent by the network device, the relay UE can determine, based on the first information related to the first control information, which one of the relay UE and the at least one remote UE is scheduled by using the first control information.

In a second implementation solution, in this embodiment of the present invention, the relay UE receives first control information sent by the network device; and the relay UE determines, based on first information, that the first control information is used to schedule a first-type device or a second-type device. The first-type device is the relay UE, and the second-type device includes the at least one remote UE; the at least one remote UE communicates with the network device by using the relay UE; and the first information includes: first indication information included in the first control information, a radio network temporary identifier for scrambling the first control information, a payload size of the first control information, a PDCCH that carries the first control information, or a subframe in which the first control information is located. In this way, after receiving the first control information sent by the network device, the relay UE can determine, based on the first information related to the first control information, a type of device scheduled by using the first control information.

In addition, in this embodiment of the present invention, the remote UE detects first control information sent by the network device; the remote UE determines, based on first information, that the first control information is used to schedule the remote UE, where the first information includes at least one of the following: a payload size of the first control information, a PDCCH that carries the first control information, and a subframe in which the first control information is located; and the remote UE transmits data based on the first control information. In this way, after receiving the first control information sent by the network device, the remote UE can determine, based on the first information related to the first control information, whether the first control information is used to schedule the remote UE.

It should be noted that, in addition to being applicable to the system architecture diagram shown in FIG. 1, the solutions in this embodiment of the present invention are also applicable to another scenario. The first device is an access network device, for example, a relay node, a transmission reception point (TRP), a relay transmission reception point (rTRP), or a base station. The at least one second device is user equipment. The network device is an access network device, for example, a continuously evolved node B (gNB), a transmission reception point (TRP), a donor transmission reception point or a home transmission reception point (donor transmission reception point, donor TRP), an anchor transmission reception point (anchor TRP), an evolved node B (eNB), a radio network controller (RNC), a node B (NB), a base station controller (BSC), a base transceiver station (BTS), and a home base station (for example, home evolved Node B, or home Node B, HNB). The network device may be directly connected to a core network. The at least one second device communicates with the network device by using the first device. The first device may be wirelessly connected to the network device, and the first device may be further connected to the network device by using at least one another first device. A link between the first device and the network device may be referred to as a backhaul link. A link between the second device and the first device may be referred to as an access link. The network device may allocate resources to the first device and the second device. In a scenario in which resources are allocated to the first device and the second device by using DCI, for the first device, DCI used to schedule the first device or DCI used to schedule the second device needs to be detected, and how to determine whether the DCI is used to schedule the first device or the second device is still a problem worthy of consideration; for the second device, how to detect the DCI used to schedule the second device is still a problem worthy of consideration.

It should be further noted that scrambling control information in this embodiment of the present invention may be: scrambling, after cyclic redundancy check (CRC) attach is performed on the control information, a CRC check bit by using an RNTI. Correspondingly, descrambling the control information is descrambling, by using the RNTI, the CRC check bit in a sequence obtained after channel decoding. Alternatively, scrambling control information in this embodiment of the present invention may be: scrambling, by using an RNTI, a sequence obtained after CRC attach is performed on the control information. Correspondingly, descrambling the control information is descrambling, by using the RNTI, a sequence obtained after channel decoding.

Figure 2:
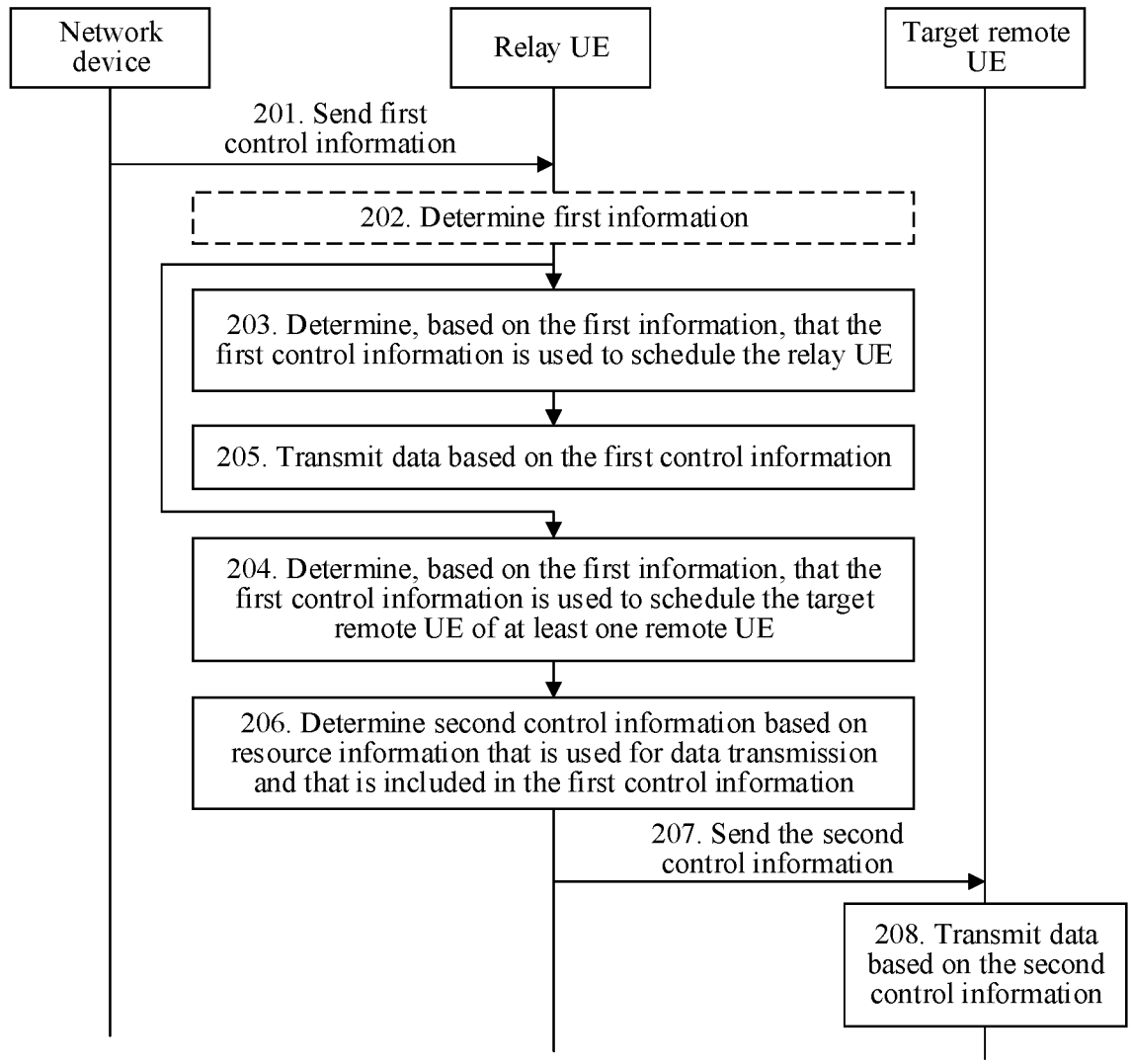
FIG. 2 shows a control information processing method according to an embodiment of the present invention.

Based on the system architecture diagram shown in FIG. 1, FIG. 2 shows a control information processing method according to an embodiment of the present invention. As shown in FIG. 2, a first device, at least one second device, and a network device are included in this embodiment. For example, the first device is relay UE, each of the at least one second device is remote UE. In this embodiment, the at least one remote UE communicates with the network device by using the relay UE. The relay UE in FIG. 2 may determine a target device to be scheduled by using first control information. The target device is any one of the relay UE and the at least one remote UE, and target remote UE is any one of the at least one remote UE.

As shown in FIG. 2, the control information processing method includes steps 201 to 208. Refer to the following specific description.

201. The network device sends the first control information.

The first control information includes resource information used for data transmission. The resource information herein may include at least one of frequency domain information of a resource and time domain information of the resource.

Optionally, in another case, the first control information includes a parameter used for data transmission, and excludes the resource information used for data transmission. In still another case, the first control information includes a parameter and the resource information that are used for data transmission. The parameter used for data transmission mentioned herein may include but is not limited to a power parameter and a modulation and coding scheme (MCS).

Correspondingly, the relay UE receives the first control information sent by the network device. Optionally, the relay UE may also detect, monitor, or decode the first control information sent by the network device.

202. The relay UE determines first information.

This step is optional. The first information herein is information related to the first control information. For example, the first information may include at least one of the following: the first control information, a radio network temporary identifier for scrambling the first control information, a payload size of the first control information, a PDCCH that carries the first control information, and a subframe in which the first control information is located.

The following separately describes items that may be included in the first information.

(1) The first information may include the radio network temporary identifier (RNTI) for scrambling the first control information. When allocating, by using control information, resource information used for data transmission, the network device needs to scramble the control information, and in addition, the control information is scrambled by using an RNTI. Therefore, the control information can be successfully received only when the control information is descrambled by using the RNTI used during scrambling. After successfully receiving the first control information, the relay UE may determine the RNTI for scrambling the first control information. In addition, a network side allocates one RNTI to one UE, that is, one UE corresponds to one RNTI. In this embodiment, RNTIs of the relay UE and the at least one remote UE may be the same; RNTIs of the relay UE and the at least one remote UE may be different; or RNTIs of the relay UE and some remote UEs may be the same, and RNTIs of remaining remote UEs may be the same or different.

For example, the network device allocates an RNTI 1 to a device 1. If the network device allocates resource information to the device 1 and indicates the resource information by using control information, the network device scrambles the control information by using the RNTI 1, and sends scrambled control information. A device that detects the scrambled control information can determine, only after descrambling the scrambled control information by using the RNTI 1, the resource information allocated by the network device.

(2) The first information may include the first control information, to be specific, indication information included in the first control information. After successfully receiving scrambled first control information, the relay UE may determine the indication information included in the first control information. For example, the indication information may be first indication information, and may be used to determine which one of the relay UE and the at least one remote UE is to be scheduled by using the first control information. In other words, the first indication information corresponds to an identity of one UE. For another example, the indication information may be second indication information, and the second indication information may be used with another parameter to determine which one of the relay UE and the at least one remote UE is to be scheduled by using the first control information. In other words, the second indication information corresponds to identities of the at least two UEs.

(3) The first information may include the payload size of the first control information. The payload size of the first control information herein is a quantity of bits occupied by the first control information, for example, 30 bits or 32 bits. After successfully receiving scrambled first control information, the relay UE may determine the quantity of bits occupied by the first control information.

(4) The first information may include a physical downlink control channel (PDCCH) that carries the first control information. After successfully receiving scrambled first control information, the relay UE may determine the PDCCH that carries the first control information. A device scheduled by using control information may correspond to a PDCCH that carries the control information, so that a specific device to be scheduled by using the first control information can be determined based on the PDCCH that carries the control information.

Figure 3:
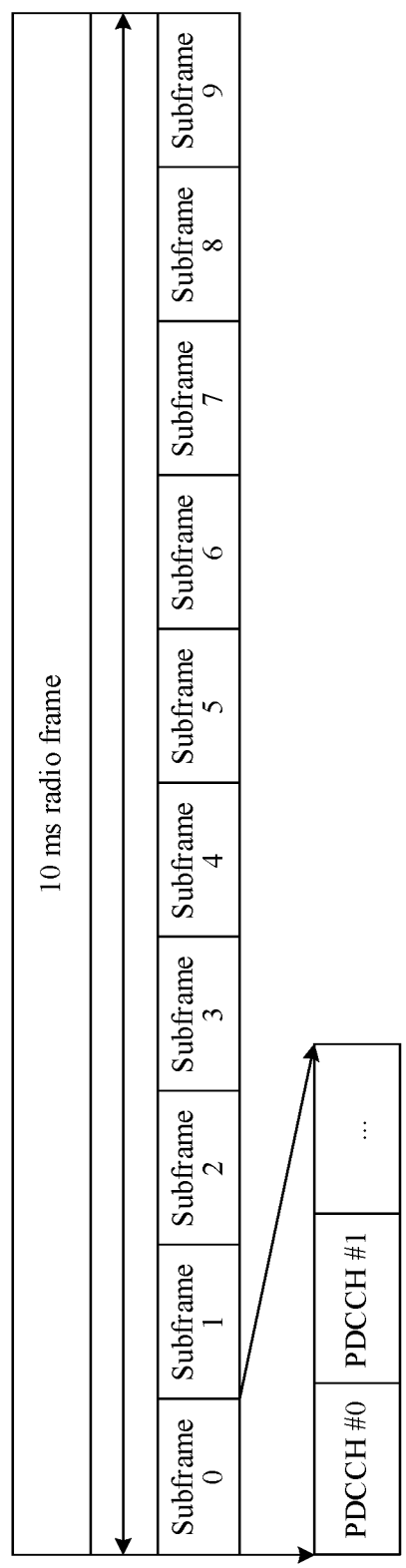
FIG. 3 shows a possible structure of a radio frame according to an embodiment of the present invention.

For example, FIG. 3 shows a possible structure of a radio frame according to an embodiment of the present invention. As shown in FIG. 3, a 10 ms radio frame includes 10 subframes, each subframe is 1 ms, and one subframe includes at least two candidate PDCCHs. The at least two candidate PDCCHs may be classified into at least two candidate PDCCH sets according to a preset rule, and control information carried by different candidate PDCCH sets is used to schedule different devices.

It should be noted that, in the embodiments corresponding to FIG. 2 and other accompanying drawings, the PDCCH that carries the first control information may further be an enhanced physical downlink control channel (EPDCCH), and both the EPDCCH and the PDCCH may be used to carry the first control information. In this embodiment of the present invention, the PDCCH is used for description. A case in which the EPDCCH is used to carry the first control information may be deduced by analogy with reference to specific descriptions of using the PDCCH to carry the first control information, and details are not described herein again.

(5) The first information may include the subframe in which the first control information is located. After successfully receiving scrambled first control information, the relay UE may determine the subframe in which the first control information is located. A plurality of subframes may be used to transmit control information, and therefore a device scheduled by using control information may correspond to the subframe in which the first control information is located, so that a specific device scheduled by using the first control information can be determined based on the subframe in which the first control information is located.

For example, with reference to FIG. 3, a radio frame includes 10 subframes. In practice, a plurality of subframes in the 10 subframes may be used to send control information. Because the subframes that are allowed to be used to send control information may be classified into at least two candidate subframe sets according to a preset rule, control information sent by using different candidate subframe sets is used to schedule different devices.

It should be noted that, in the embodiments corresponding to FIG. 2 and other accompanying drawings, the subframe in which the first control information is located may also be a slot, a small/mini slot, a symbol (for example, an orthogonal frequency division multiplexing (OFDM) symbol), or the like in which the first control information is located. In this embodiment of the present invention, the subframe in which the first control information is located is described. For a case of the slot, the small/mini slot, or the symbol in which the first control information is located may be deduced by analogy with reference to specific descriptions of the subframe in which the first control information is located, and details are not described herein again.

203. The relay UE determines, based on the first information, that the first control information is used to schedule the relay UE.

204. The relay UE determines, based on the first information, that the first control information is used to schedule the target remote UE of the at least one remote UE.

The following describes steps 203 and 204 in detail based on different cases of the first information.

(1) In a first possible implementation solution, the first information includes the RNTI for scrambling the first control information. The relay UE determines, based on the RNTI for scrambling the first control information which user equipment is to be scheduled by using the first control information.

For example, seven remote UEs communicate with the network device by using the relay UE, and different UEs are in a one-to-one correspondence with RNTIs. Table 1 shows a mapping relationship between an RNTI and a device identity. RNTIs 0 to 7 are RNTIs used to scramble first control information for the seven remote UEs and the relay UE.

TABLE 1

Mapping relationship between an RNTI and a device identity.

| | RNTI for scrambling first control information | | | | | | | |
|---|---|---|---|---|---|---|---|---|
| | RNTI 0 | RNTI 1 | RNTI 2 | RNTI 3 | RNTI 4 | RNTI 5 | RNTI 6 | RNTI 7 |
| Device identity | ID of relay UE | ID of remote UE 1 | ID of remote UE 2 | ID of remote UE 3 | ID of remote UE 4 | ID of remote UE 5 | ID of remote UE 6 | ID of remote UE 7 |

When the network device needs to send the first control information used to schedule the relay UE, the network device may scramble the first control information based on the "RNTI 0" corresponding to the ID of the relay UE. Similarly, when the network device needs to send the first control information used to schedule the remote UE 5, the network device may scramble the first control information based on the "RNTI 5" corresponding to the ID of the remote UE 5. In this case, when detecting or receiving the first control information, the relay UE may first determine an RNTI based on which the first control information is successfully descrambled, and then determine a device identity corresponding to the RNTI, to determine which UE is to be scheduled by using the first control information.

Optionally, the mapping relationship between an RNTI and a device identity may be notified by the network device to the relay UE. In this case, the relay UE may determine an RNTI corresponding to each remote UE connected to the relay UE, so that when the relay UE detects or receives the first control information, the relay UE can separately descramble the first control information based on the RNTIs in the mapping relationship. Once an RNTI for successful descrambling is found, UE scheduled by using the first control information can be determined.

(2) In a second possible implementation solution, the first control information includes the first indication information, and the first information includes the first indication information included in the first control information. The relay UE determines, based on the first indication information which user equipment is to be scheduled by using the first control information.

For example, seven remote UEs communicate with the network device by using the relay UE, and the first indication information is a 3-bit field in the first control information. Table 2 shows a mapping relationship between first indication information and a device identity. Eight pieces of first indication information are in a one-to-one correspondence with identities of the seven remote UEs and the relay UE. In this example, the first indication information occupies a location of three bits in the first control information. A quantity of bits occupied by the first indication information is not limited in this embodiment of the present invention.

When the network device needs to send the first control information used to schedule the relay UE, the network device may write a corresponding field according to the first indication information "000" corresponding to the ID of the relay UE. Similarly, when the network device needs to send the first control information used to schedule the remote UE 5, the network device may write a corresponding field according to the first indication information "101" corresponding to the ID of the remote UE 5. In this way, when detecting or receiving the first control information, the relay UE can determine a scheduled device based on the first control information.

It can be understood that, because the first indication information in the first control information may be used to determine which UE is scheduled by using the first control information, control information used to schedule different UEs may be scrambled by using a same RNTI. In this way, the relay UE only needs to determine search space based on one RNTI, so that a quantity of times of determining the search space is reduced, and a quantity of times of descrambling the first control information is reduced, thereby reducing complexity of detecting a PDCCH, and improving efficiency of determining the first indication information.

(3) In a third possible implementation solution, the first information may include the RNTI for scrambling the first control information and the second indication information included in the first control information. UE scheduled by using the first control information is determined with reference to the two parameters.

For example, seven remote UEs communicate with the network device by using the relay UE. Table 3 shows a mapping relationship between an RNTI and a device identity and a mapping relationship between second indication information and a device identity. An RNTI 0 and an RNTI 1 are RNTIs used to scramble first control information for the seven remote UEs and the relay UE. The second indication information is a field included in the first control information. In this example, the second indication information occupies a location of two bits in the first control information. A quantity of bits occupied by the second indication information is not limited in this embodiment of the present invention.

TABLE 3

Mapping relationship between an RNTI and a device identity and mapping relationship between second indication information and a device identity

| | Second indication information 00 | Second indication information 01 | Second indication information 10 | Second indication information 11 |
|---|---|---|---|---|
| RNTI 0 | ID of relay UE | ID of remote UE 1 | ID of remote UE 2 | ID of remote UE 3 |
| RNTI 1 | ID of remote UE 4 | ID of remote UE 5 | ID of remote UE 6 | ID of remote UE 7 |

When the network device needs to send the first control information used to schedule the relay UE, the network device may scramble the first control information based on the "RNTI 0" corresponding to the ID of the relay UE, and write "00" into the field of the second indication information in the first control information. Similarly, when the network device needs to send the first control information used to schedule the remote UE 5, the network device may scramble the first control information based on the "RNTI 1" corresponding to the ID of the remote UE5, and write "01" into the field of the second indication information in the first control information. In this case, when detecting or receiving the first control information, the relay UE may first determine an RNTI for successfully receiving the first control information, and then determine the second indication information included in the first control information, to

TABLE 2

Mapping relationship between first indication information and a device identity

| | First indication information | | | | | | | |
|---|---|---|---|---|---|---|---|---|
| | 000 | 001 | 010 | 011 | 100 | 101 | 110 | 111 |
| Device identity | ID of relay UE | ID of remote UE 1 | ID of remote UE 2 | ID of remote UE 3 | ID of remote UE 4 | ID of remote UE 5 | ID of remote UE 6 | ID of remote UE 7 | determine a device identity corresponding to both the RNTI and the second indication information, and determine the UE scheduled by using the first control information.

(4) In a fourth possible implementation solution, the first information may include the RNTI for scrambling the first control information and the PDCCH that carries the first control information. UE scheduled by using the first control information is determined with reference to the two parameters.

For example, 15 remote UEs communicate with the network device by using the relay UE. Table 4 shows a mapping relationship between an RNTI and a device identity and a mapping relationship between a PDCCH that carries first control information and a device identity. An RNTI 0 and an RNTI 1 are RNTIs used to scramble first control information for the 15 remote UEs and the relay UE. The first control information used to schedule the 15 remote UEs and the relay UE is carried in the following PDCCHs 0 to 3 and sent.

TABLE 4

Mapping relationship between an RNTI and a device identity and mapping relationship between a PDCCH that carries first control information and a device identity

|  | PDCCH 0 | PDCCH 1 | PDCCH 2 | PDCCH 3 |
| --- | --- | --- | --- | --- |
| RNTI 0 | ID of relay UE | ID of remote UE 1 | ID of remote UE 2 | ID of remote UE 3 |
| RNTI 1 | ID of remote UE 4 | ID of remote UE 5 | ID of remote UE 6 | ID of remote UE 7 |
| RNTI 2 | ID of remote UE 8 | ID of remote UE 9 | ID of remote UE 10 | ID of remote UE 11 |
| RNTI 3 | ID of remote UE 12 | ID of remote UE 13 | ID of remote UE 14 | ID of remote UE 15 |

When the network device needs to send the first control information used to schedule the relay UE, the network device may scramble the first control information based on the "RNTI 0" corresponding to the relay UE ID, and send the first control information in a location of the PDCCH 0 in a subframe. Similarly, when the network device needs to send the first control information used to schedule the remote UE 5, the network device may scramble the first control information based on the "RNTI 1" corresponding to the ID of the remote UE 5, and send the first control information in a location of the PDCCH 1 in a subframe. In this case, when detecting or receiving the first control information, the relay UE may determine an RNTI for successfully receiving the first control information, and determine the PDCCH that carries the first control information, to determine a device identity corresponding to both the RNTI and the PDCCH, and determine the UE the first control information is used to schedule.

Optionally, in practice, candidate PDCCHs that carry first control information for scheduling different UEs are in search space determined by using a same RNTI. For example, the search space is determined by using an RNTI allocated by the network device to the relay UE. Candidate PDCCHs that carry first control information for scheduling different UEs may alternatively be in search space determined by using different RNTIs. For example, a candidate PDCCH that carries first control information is in search space determined based on an RNTI for scrambling the first control information. For example, a PDCCH that carries the first control information for scheduling the remote UE 1 is a candidate PDCCH 1 in search space determined based on the RNTI 0. A PDCCH that carries the first control information used for scheduling the remote UE 5 is a candidate PDCCH 1 in search space determined based on the RNTI 1.

It should be noted that, the search space in the embodiment corresponding to FIG. 2 and other accompanying drawings is a set of at least two candidate physical downlink control channels, one candidate PDCCH is transmitted on one or more aggregated control channel elements (CCE), and a quantity of aggregated CCEs is an aggregation level of the candidate PDCCH.

Search space is determined based on an RNTI. For example, a CCE corresponding to a candidate PDCCH m in search space $S_k^{(L)}$ is determined by using the following formula:

$$L\{(Y_k+m')\bmod \lfloor N_{CCE,k}/L \rfloor\}+i$$

L is an aggregation level, and a value of L may be 1, 2, 4, or 8, or may be another value; i=0, ..., L−1; $N_{CCE,k}$ is a quantity (Size) of CCEs in a control region in a subframe k; m=0, ..., $M^{(L)}$−1; and $M^{(L)}$ is a quantity of candidate PDCCHs in the search space $S_k^{(L)}$. The search space may be classified into common search space and user equipment-specific search space (UE-specific, that is, UE-specific search space). For the common search space, m'=m, and $Y_k$ is 0. For the user equipment-specific search space, $Y_k$ is defined as $Y_k=(A \cdot Y_{k-1})\bmod D$. $Y_{-1}=n_{RNTI} \neq 0$, A=39827, D=65537, k=$\lfloor n_s/2 \rfloor$, and $n_s$ is a number (whose value range may be 0 to 19) of a slot in a subframe. When user equipment is not configured for cross-carrier scheduling, m'=m. For example, Table 5 may show a correspondence among L, $N_{CCE,k}$ and $M^{(L)}$.

TABLE 5

| | Search space $S_k^{(L)}$ | | |
| --- | --- | --- | --- |
| Type of the search space | Aggregation level L | Quantity of CCEs | Quantity $M^{(L)}$ of candidate PDCCHs |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

(5) In a fifth possible implementation solution, the first information may include the RNTI for scrambling the first control information and the subframe in which the first control information is located. UE scheduled by using the first control information is determined with reference to the two parameters.

For example, 15 remote UEs communicate with the network device by using the relay UE. Table 6 shows a mapping relationship between an RNTI and a device identity and a mapping relationship between a subframe in which first control information is located and a device identity. An RNTI 0 and an RNTI 1 are RNTIs used to scramble first control information for the 15 remote UEs and the relay UE. Subframes in which the first control information used to schedule the 15 remote UEs and the relay UE are located include locations of subframes 0 to 7.

TABLE 6

Mapping relationship between an RNTI and a device identity and mapping relationship between a subframe in which first control information is located and a device identity

|  | Subframe 0 | Subframe 1 | Subframe 2 | Subframe 3 | Subframe 4 | Subframe 5 | Subframe 6 | Subframe 7 |
|---|---|---|---|---|---|---|---|---|
| RNTI 0 | ID of relay UE | ID of remote UE 1 | ID of remote UE 2 | ID of remote UE 3 | ID of remote UE 4 | ID of remote UE 5 | ID of remote UE 6 | ID of remote UE 7 |
| RNTI 1 | ID of remote UE 8 | ID of remote UE 9 | ID of remote UE 10 | ID of remote UE 11 | ID of remote UE 12 | ID of remote UE 13 | ID of remote UE 14 | ID of remote UE 15 |

When the network device needs to send the first control information used to schedule the relay UE, the network device may scramble the first control information based on the "RNTI 0" corresponding to the ID of the relay UE, and send the first control information in the location of the "subframe 0". Similarly, when the network device needs to send the first control information used to schedule the remote UE 13, the network device may scramble the first control information based on the "RNTI 1" corresponding to the ID of the remote UE 13, and send the first control information in the location of the "subframe 5". In this way, when detecting or receiving the first control information, the relay UE may determine an RNTI for successfully receiving the first control information, and determine the subframe in which the first control information is located, to determine a device identity corresponding to both the RNTI and the subframe, and determine the UE scheduled by using the first control information.

(6) In a sixth possible implementation solution, the first information may include the second indication information included in the first control information and the PDCCH that carries the first control information. UE scheduled by using the first control information is determined with reference to the two parameters.

For example, seven remote UEs communicate with the network device by using the relay UE. Table 7 shows a mapping relationship between second indication information and a device identity and a mapping relationship between a PDCCH that carries first control information and a device identity. The second indication information is a field included in the first control information. First control information for scheduling the seven remote UEs and the relay UE carried in the following locations of PDCCHs 0 to 3 and sent. In this example, the second indication information occupies a location of one bit in the first control information. A quantity of bits occupied by the second indication information is not limited in this embodiment of the present invention.

TABLE 7

Mapping relationship between second indication information and a device identity and mapping relationship between a PDCCH that carries first control information and a device identity

|  | PDCCH 0 | PDCCH 1 | PDCCH 2 | PDCCH 3 |
|---|---|---|---|---|
| Second indication information 0 | ID of relay UE | ID of remote UE 1 | ID of remote UE 2 | ID of remote UE 3 |
| Second indication information 1 | ID of remote UE 4 | ID of remote UE 5 | ID of remote UE 6 | ID of remote UE 7 |

When the network device needs to send the first control information used to schedule the relay UE, the network device may write "0" into the field of the second indication information in the first control information, and send the first control information in the location of the "subframe 0". Similarly, when the network device needs to send the first control information used to schedule the remote UE 13, the network device may write "1" into the field of the second indication information in the first control information, and send the first control information in the location of the "subframe 5". In this way, when detecting or receiving the first control information, the relay UE may determine the second indication information included in the first control information, and determine the subframe in which the first control information is located, to determine a device identity corresponding to both the second indication information and the subframe, and determine the UE scheduled by using the first control information.

(7) In a seventh possible implementation solution, the first information may include the second indication information included in the first control information and the subframe in which the first control information is located. UE scheduled by using the first control information is determined with reference to the two parameters.

For example, 15 remote UEs communicate with the network device by using the relay UE. Table 8 shows a mapping relationship between second indication information and a device identity and a mapping relationship between a subframe in which first control information is located and a device identity. The second indication information is a field included in the first control information. Subframes in which first control information used to schedule the 15 remote UEs and the relay UE are located include locations of subframes 0 to 7. In this example, the second indication information occupies a location of one bit in the first control information. A quantity of bits occupied by the second indication information is not limited in this embodiment of the present invention.

TABLE 8

Mapping relationship between second indication information and a device identity and mapping relationship between a subframe in which first control information is located and a device identity

|  | Subframe 0 | Subframe 1 | Subframe 2 | Subframe 3 | Subframe 4 | Subframe 5 | Subframe 6 | Subframe 7 |
|---|---|---|---|---|---|---|---|---|
| Second indication information 0 | ID of relay UE | ID of remote UE 1 | ID of remote UE 2 | ID of remote UE 3 | ID of remote UE 4 | ID of remote UE 5 | ID of remote UE 6 | ID of remote UE 7 |
| Second indication information 1 | ID of remote UE 8 | ID of remote UE 9 | ID of remote UE 10 | ID of remote UE 11 | ID of remote UE 12 | ID of remote UE 13 | ID of remote UE 14 | ID of remote UE 15 |

When the network device needs to send the first control information used to schedule the relay UE, the network device may write "0" into the field of the second indication information in the first control information, and send the first control information in the location of the "subframe 0". Similarly, when the network device needs to send the first control information used to schedule the remote UE 13, the network device may write "1" into the field of the second indication information in the first control information, and send the first control information in the location of the "subframe 0". In this way, when detecting or receiving the first control information, the relay UE may determine the second indication information included in the first control information, and determine the subframe in which the first control information is located, to determine a device identity corresponding to both the second indication information and the subframe, and determine the UE scheduled by using the first control information.

Optionally, in the sixth possible implementation solution, the seventh possible implementation solution, and another solution in which the UE scheduled by using the first control information is not determined by using the RNTI for scrambling the first control information, RNTIs used to scramble first control information for scheduling different UEs in this embodiment of the present invention are the same. In this way, the relay UE only needs to determine search space based on the RNTI, so that a quantity of times of determining the search space is reduced, and a quantity of times of descrambling the first control information is reduced, thereby reducing complexity of detecting a PDCCH, and improving efficiency of determining the first control information.

Optionally, in the first possible implementation solution to the seventh possible implementation solution, and in another solution in which the UE scheduled by using the first control information is not determined based on the payload size of the first control information, a payload size of the first control information used to schedule the relay UE may be the same as a payload size of the first control information used to schedule the at least one remote UE. In a process of determining the payload size of the first control information, for a size of each type of payload, the relay UE needs to perform channel decoding once. Therefore, by setting payload sizes of the first control information to be the same, the relay UE only needs to perform channel decoding once, improving efficiency of determining the first control information.

In an eighth possible implementation solution, the first information may include the payload size of the first control information, and mapping relationships between different payload sizes and different device identities are set. In this case, the relay UE first determines the payload size of the first control information after successfully receiving the first control information, and then determines a device identity corresponding to the payload size, to determine the UE scheduled by using the first control information. A specific implementation is the same as the first possible implementation solution or the second possible implementation solution, and a difference is that in the implementation solution, what correspond to the device identities are the payload sizes of the first control information. Optionally, when the first information includes the first control information, the UE scheduled by using the first control information may be further determined with reference to another parameter, and this is not enumerated one by one herein.

It should be noted that, based on the parameters that may be included in the first information, other combination manners may further exist, and are not exemplified one by one herein. In all the other combination manners, that the relay UE determines the UE scheduled by using the first control information may be implemented by creating a mapping relationship between a device identity and a parameter.

Optionally, in this embodiment of the present invention, the aforementioned mapping relationships and mapping relationships in other possible implementation solutions that are not exemplified one by one may be notified by the network device to the relay UE, so that the relay UE determines the UE scheduled by using the first control information.

205. The relay UE transmits data based on the first control information.

When the relay UE determines, in step 203, that the first control information is used to schedule the relay UE, the relay UE transmits data based on the first control information. For example, when resource information included in the first control information is used to send data to first remote UE, the relay UE transmits data to the first remote UE in the resource information. Alternatively, when resource information included in the first control information is used to receive data sent by second remote UE, the relay UE receives, in the resource information, the data sent by the second remote UE. The first remote UE or the second remote UE is any one of the at least one remote UE.

Optionally, when the first control information includes a parameter used for data transmission, the relay UE transmits data based on the parameter.

Optionally, when the first control information includes a parameter and the resource information that are used for data transmission, the relay UE transmits data based on the parameter and the resource information.

206. The relay UE determines second control information based on the resource information that is used for data transmission and that is included in the first control information.

When the relay UE determines, in step 204, based on the first information, that the first control information is used to schedule the target remote UE of the at least one remote UE, the relay UE determines the second control information based on the resource information that is used for data transmission and that is included in the first control information. For specific content included in the resource information, refer to the specific description in step 201, and details are not described herein again. The second control information determined by the relay UE includes the resource information, so that after the second control information is sent to the target remote UE, the target remote UE can determine the resource information used for data transmission.

Optionally, when the first control information includes a parameter used for data transmission, and excludes the resource information used for data transmission, the relay UE determines the second control information based on the parameter that is used for data transmission and that is included in the first control information.

Optionally, when the first control information includes a parameter and the resource information that are used for data transmission, the relay UE determines the second control information based on the parameter and the resource information that are used for data transmission and that are included in the first control information.

207. The relay UE sends the second control information to the target remote UE.

After the relay UE determines the second control information, the relay UE sends the second control information to the remote UE.

Correspondingly, the target remote UE receives the second control information.

208. The target remote UE transmits data based on the second control information.

When the target remote UE receives the second control information in step 207, the target remote UE transmits the data based on the second control information. For example, when the resource information included in the second control information is used to send data to the relay UE, the target remote UE transmits data to the relay UE in the resource information. Alternatively, when the resource information included in the second control information is used to receive data sent by the relay UE, the target remote UE receives, in the resource information, the data sent by the relay UE.

Optionally, when the first control information includes the parameter used for data transmission, the target remote UE transmits data based on the parameter.

Optionally, when the first control information includes the parameter and the resource information that are used for data transmission, the target remote UE transmits data based on the parameter and the resource information.

In this embodiment of the present invention, after receiving the first control information sent by the network device, the relay UE can determine, based on the first information related to the first control information, which one of the relay UE and the at least one remote UE is scheduled by using the first control information.

Figure 4:
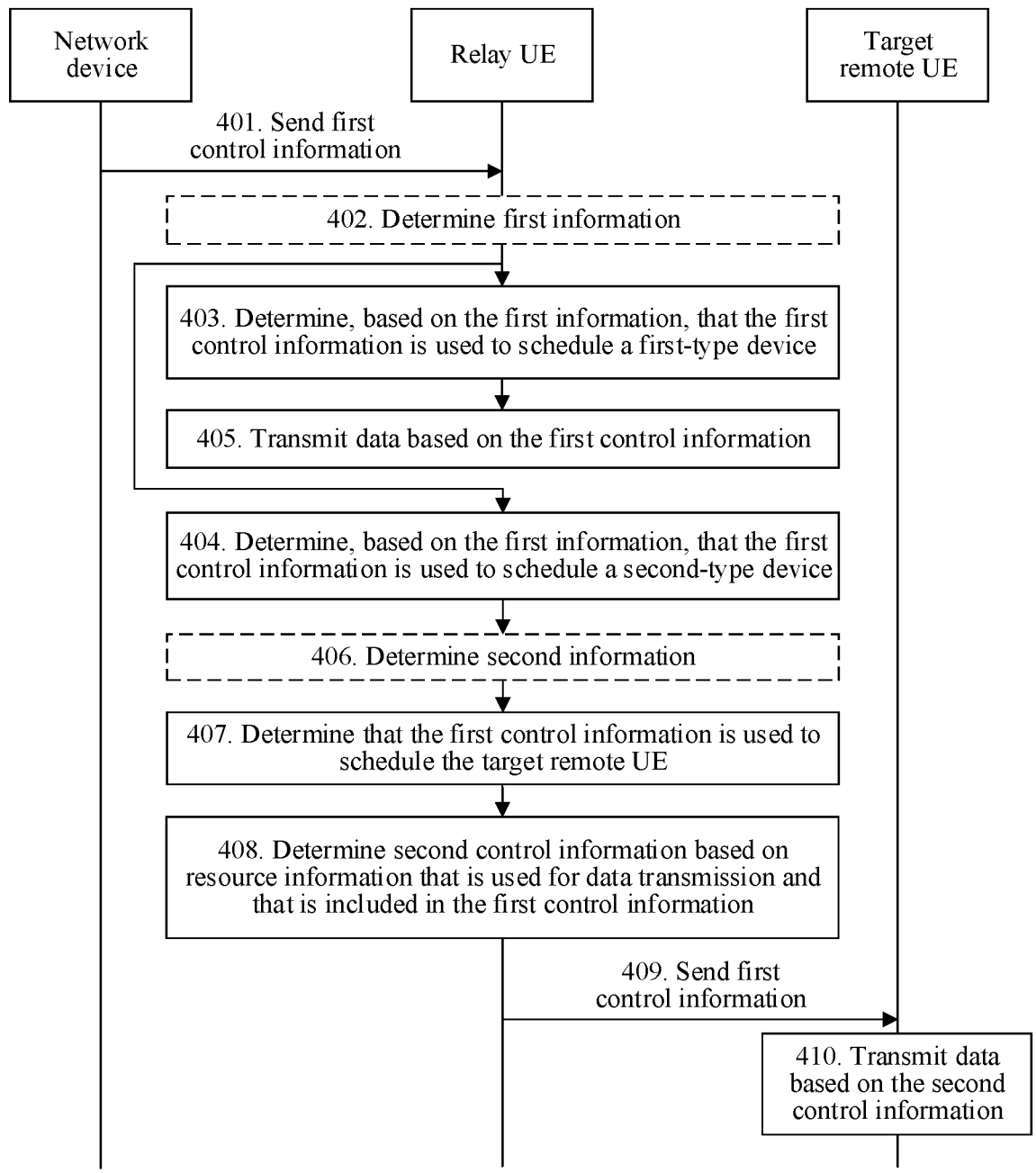
FIG. 4 shows another control information processing method according to an embodiment of the present invention.

Based on the system architecture diagram shown in FIG. 1, FIG. 4 shows a control information processing method according to an embodiment of the present invention. As shown in FIG. 4, a first device, at least one second device, and a network device are included in this embodiment. For example, the first device is relay UE, each of the at least one second device is remote UE. In this embodiment, the at least one remote UE communicates with the network device by using the relay UE. The relay UE in FIG. 4 may determine a target device to be scheduled by using first control information. The target device is any one of the relay UE and the at least one remote UE.

401. The network device sends the first control information.

For step 401, refer to the detailed description of step 201 in the embodiment shown in FIG. 2, and details are not described herein again.

402. The relay UE determines first information.

This step is optional. The first information herein is information related to the first control information. The first information herein is different from the first information in the embodiment shown in FIG. 2. For example, the first information includes: first indication information included in the first control information, a radio network temporary identifier for scrambling the first control information, a payload size of the first control information, a PDCCH that carries the first control information, or a subframe in which the first control information is located.

The relay UE may determine, based on the first information, that a type of device scheduled by using the first control information includes a first-type device and a second-type device. The first-type device is the relay UE, and the second-type device includes the at least one remote UE.

The following separately describes items that may be included in the first information.

(1) The first information may include the RNTI for scrambling the first control information. When allocating, by using control information, resource information used for data transmission, the network device needs to scramble the control information, and in addition, the control information is scrambled by using an RNTI. Therefore, the control information can be successfully received only when the control information is descrambled by using the RNTI used dining scrambling. After successfully receiving the first control information, the relay UE may determine the RNTI for scrambling the first control information. In addition, a network side allocates one RNTI to one UE, that is, one UE corresponds to one RNTI. In this embodiment, RNTIs for the relay UE and the at least one remote UE are different.

For example, the network device allocates an RNTI 1 to a device 1. If the network device allocates resource information to the device 1 and indicates the resource information by using control information, the network device scrambles the control information by using the RNTI 1, and sends scrambled control information. A device that detects the scrambled control information can determine, only after descrambling the scrambled control information by using the RNTI 1, the resource information allocated by the network device.

(2) The first information may include the first control information, to be specific, indication information included in the first control information. After successfully receiving scrambled first control information, the relay UE may determine the indication information included in the first control information.

(3) The first information may include the payload size of the first control information. The payload size of the first control information herein is a quantity of bits occupied by the first control information, for example, 30 bits or 32 bits. After successfully receiving scrambled first control information, the relay UE may determine the quantity of bits occupied by the first control information. (4) The first information may include the PDCCH that carries the first control information. After successfully receiving scrambled first control information, the relay UE may determine the PDCCH that carries the first control information.

For example, with reference to the description of the PDCCH in the radio frame in the embodiment shown in FIG. 2, one subframe includes at least two candidate PDCCHs, the at least two candidate PDCCHs may be classified into at least two candidate PDCCH sets according to a preset rule, and control information carried by different candidate PDCCH sets is used to schedule different types of devices.

(5) The first information may include the subframe in which the first control information is located. After successfully receiving scrambled first control information, the relay UE may determine the sub frame in which the first control information is located. A plurality of subframes may be used to transmit control information, and therefore a type of device scheduled by using the control information may correspond to the subframe in which the first control information is located, so that whether the first control information is used to schedule the first-type device or the second-type device can be determined based on the subframe in which the first control information is located.

For example, with reference to FIG. 3, a plurality of subframes may be used to send control information. The subframes that are allowed to be used to send control information may be classified into at least two candidate subframe sets according to a preset rule, and control information sent by using different candidate subframe sets is used to schedule different types of devices.

403. The relay UE determines, based on the first information, that the first control information is used to schedule the first-type device.

404. The relay UE determines, based on the first information, that the first control information is used to schedule the second-type device.

The following describes steps 403 and 404 in detail based on different cases of the first information. The types of devices in this embodiment of the present invention include the first-type device and the second-type device. The first-type device is the relay UE, and the second-type device is the at least one remote UE.

(1) In a first possible implementation solution, the first information includes the RNTI for scrambling the first control information. The relay UE determines, based on the RNTI for scrambling the first control information, that the first control information is used to schedule the first-type device or the second-type device.

For example, an RNTI for scrambling control information used to schedule the first-type device is different from an RNTI for scrambling control information used to schedule the second-type device. Seven remote UEs communicate with the network device by using the relay UE. Table 9 shows a mapping relationship between an RNTI and a device identity. An RNTI for the first-type device is an RNTI 0 corresponding to an ID of the relay UE, and the RNTI for the second-type device is an RNTI 1 corresponding to an ID of the at least one remote UE. For another example, Table 10 shows another mapping relationship between an RNTI and a device identity. The RNTI for the first-type device is an RNTI 0 corresponding to an ID of the relay UE, and RNTIs for the second-type device are an RNTI 1, an RNTI 2, and an RNTI 3 that are corresponding to IDs of the at least one remote UE.

TABLE 9

Mapping relationship between an RNTI and a device identity

| RNTI for scrambling first control information | | | | | | | |
|---|---|---|---|---|---|---|---|
| RNTI 0 | RNTI 1 | RNTI 1 | RNTI 1 | RNTI 1 | RNTI 1 | RNTI 1 | RNTI 1 |

| Device identity | ID of relay UE | ID of remote UE 1 | ID of remote UE 2 | ID of remote UE 3 | ID of remote UE 4 | ID of remote UE 5 | ID of remote UE 6 | ID of remote UE 7 |

TABLE 10

Mapping relationship between an RNTI and a device identity

| RNTI for scrambling first control information | | | | | | | |
|---|---|---|---|---|---|---|---|
| RNTI 0 | RNTI 1 | RNTI 1 | RNTI 2 | RNTI 2 | RNTI 3 | RNTI 3 | RNTI 3 |

| Device identity | ID of relay UE | ID of remote UE 1 | ID of remote UE 2 | ID of remote UE 3 | ID of remote UE 4 | ID of remote UE 5 | ID of remote UE 6 | ID of remote UE 7 |

In both the foregoing manners in Table 9 and Table 10, the RNTI for the first-type device may be different from the RNTI for the second-type device. A quantity of RNTIs corresponding to the at least one remote UE is not limited in this embodiment of the present invention. Using Table 10 as an example, when the network device needs to send the first control information used to schedule the relay UE, the network device may scramble the first control information based on the "RNTI 0" corresponding to the ID of the relay UE. Similarly, when the network device needs to send the first control information used to schedule the remote UE 5, the network device may scramble the first control information based on the RNTI 3 corresponding to the ID of the remote UE 5. In this case, when detecting or receiving the first control information, the relay UE may first determine an RNTI for successfully receiving the first control information, to determine a type of device scheduled by using the first control information.

Optionally, the mapping relationship between an RNTI and a device identity may be notified by the network device to the relay UE. In this way, the relay UE may determine RNTIs corresponding to the first-type device and the second device, so that when the relay UE detects the first control information, the relay UE can separately descramble the first control information based on the RNTIs in the mapping relationship. Once an RNTI for successful reception is found, a type of device scheduled by using the first control information can be determined.

Optionally, search space for detecting the first control information used to schedule the remote UE is the same as search space for detecting the first control information used to schedule the relay UE. Optionally, the search space is determined based on an RNTI for scrambling the first control information used to schedule the relay UE. Alternatively, the search space is determined based on another RNTI for scrambling other control information (which is not the first control information) used to schedule the relay UE (because a plurality of RNTIs may be configured for the relay UE and different RNTIs are used to scramble different control information). In this way, the relay UE can detect the PDCCH in search space the same as the search space for detecting the first control information used to schedule the relay UE, thereby reducing complexity of detecting the PDCCH.

Optionally, a payload size of the first control information that is used to schedule the remote UE and that is in search space is equal to a payload size of the first control information that is used to schedule the relay UE and that is in the same search space. The first control information used to schedule the relay UE herein may be the first control information used to schedule the relay UE, or may be other control information used to schedule the relay UE, to be specific, third control information (for example, the third control information includes a resource used by the relay UE to send data to a base station, or a resource used by the relay UE to receive data sent by a base station). For example, the first control information and the third control information are DCI. The relay UE needs to detect/decode, in search space determined based on a cell radio network temporary identifier (C-RNTI), a PDCCH that carries DCI format 0 (the third control information). In this case, in the search space determined based on the C-RNTI, a payload size of DCI used to schedule the remote UE is equal to a payload size of DCI format 0. For another example, the relay UE needs to detect/decode, in search space determined based on a C-RNTI, a PDCCH that carries DCI format 0 and a PDCCH that carries DCI format 1, and payload sizes of the two pieces of DCI are different. In this case, in the search space determined based on the C-RNTI, a payload size of DCI used to schedule the remote UE may be equal to the payload size of DCI format 0, or may be equal to the payload size of DCI format 1. In this method, the DCI used to schedule the remote UE may have two payload sizes. 0 may be padded based on the DCI information used to schedule the remote UE, so that the payload sizes are equal; or 0 may be padded based on the DCI information used to schedule the relay UE, so that the payload sizes are equal.

(2) In a second possible implementation solution, the first control information includes the first indication information, and the first information includes the first indication information included in the first control information. The relay UE determines, based on the first indication information, that the first control information is used to schedule the first-type device or the second-type device.

For example, the network device sets, for the first-type device and the second-type device, first indication information with different bit values in the first control information. Seven remote UEs communicate with the network device by using the relay UE, and the first indication information is a 1-bit field in the first control information. Table 11 shows a mapping relationship between first indication information and a device identity. First indication information for the first-type device is "0" corresponding to an ID of the relay UE, and first indication information for the second-type device is "1" corresponding to an ID of the at least one remote UE.

TABLE 11

Mapping relationship between first indication information and a device identity

| First indication information | | | | | | | |
|---|---|---|---|---|---|---|---|
| 0 | 1 | 1 | 1 | 1 | 1 | 1 | 1 |
| Device identity: ID of relay UE | ID of remote UE 1 | ID of remote UE 2 | ID of remote UE 3 | ID of remote UE 4 | ID of remote UE 5 | ID of remote UE 6 | ID of remote UE 7 |

When the network device needs to send the first control information used to schedule the relay UE, the network device may write a corresponding field according to the first indication information "0" corresponding to the ID of the relay UE. Similarly, when the network device needs to send the first control information used to schedule the remote UE 5, the network device may write a corresponding field according to the first indication information "1" corresponding to the ID of the remote UE 5. In this way, when detecting or receiving the first control information, the relay UE can determine a type of device scheduled by using the first control information.

The first indication information for the second-type device in Table 11 is the same. In an optional solution, the at least one remote UE included in the second-type device may correspond to different first indication information, and it is ensured that the first indication information corresponding to the at least one remote UE is different from the first indication information for the first-type device. In this embodiment of the present invention, a quantity of bits occupied by the first indication information in the first control information is not limited.

It can be understood that, control information used to schedule different types of devices may be scrambled by using a same RNTI. In this way, the relay UE only needs to determine search space based on the RNTI, so that a quantity of times of determining the search space is reduced, and a quantity of times of descrambling the first control information is reduced, thereby reducing complexity of detecting a PDCCH, and improving efficiency of determining the first indication information.

(3) In a third possible implementation solution, the first information may include the payload size of the first control information, and mapping relationships between different payload sizes and different device types are set. In this case, the relay UE first determines the payload size of the first control information after successfully receiving the first control information, and then determines a type of device corresponding to the payload size, to determine the type of device scheduled by using the first control information.

For example, the first control information is DCI, and the network device sets different payload sizes for DCI for the first-type device and DCI for the second-type device. Seven remote UEs communicate with the network device by using the relay UE. Table 12 shows a mapping relationship between a payload size and a device identity. M1 and M2 are integers greater than 0, and M1 is unequal to M2. Optionally, the DCI for the first-type device and the DCI for the second-type device are in different DCI formats, and payload sizes of the DCI are different. A payload size corresponding to the first-type device is M1 bits corresponding to an ID of the relay UE, and a payload size corresponding to the second-type device is M2 bits corresponding to an ID of the at least one remote UE.

mation may be used to determine that the first control information is used to schedule the first-type device or the second-type device.

For example, the network device allocates different PDCCHs to the first-type device and the second-type device, to carry the first control information. Four remote UEs communicate with the network device by using the relay UE. Table 13 shows a mapping relationship between a PDCCH that carries first control information and a device identity. The first control information used to schedule the first-type device is carried in a location of a PDCCH 1 and sent. The first control information used to schedule the second-type device is carried in a location of a PDCCH 0 and sent.

TABLE 12

| Mapping relationship between a payload size and a device identity | | | | | | | | |
|---|---|---|---|---|---|---|---|---|
| Payload size | M1 bits | M2 bits | M2 bits | M2 bits | M2 bits | M2 bits | M2 bits | M2 bits |
| Device identity | ID of relay UE | ID of remote UE 1 | ID of remote UE 2 | ID of remote UE 3 | ID of remote UE 4 | ID of remote UE 5 | ID of remote UE 6 | ID of remote UE 7 |

When the network device needs to send the first control information used to schedule the relay UE, the network device may generate the first control information based on a payload size of control information corresponding to the ID of the relay UE. Similarly, when the network device needs to send the first control information used to schedule the remote UE 5, the network device may generate the first control information based on a payload size of control information corresponding to the ID of the remote UE 5. In this case, when detecting or receiving the first control information, the relay UE may determine the payload size of the first control information, to determine the type of device scheduled by using the first control information.

In Table 12, payload sizes of the DCI for the second-type device are the same. In an optional solution, payload sizes corresponding to the at least one remote UE included in the second-type device may alternatively be different, and it is ensured that the payload sizes corresponding to the at least one remote UE are different from the payload size corresponding to the first-type device.

Optionally, in practice, 0 may be padded based on control information used to schedule the remote UE, so that the payload sizes are different; or 0 may be padded based on control information used to schedule the relay UE, so that the payload sizes are different.

Optionally, if the first control information is DCI, the first control information may be set to be the same as a payload of other control information used to schedule the relay UE. For example, a payload size of DCI used to schedule the relay UE is the same as a payload of DCI format 0; and a payload of DCI used to schedule the remote UE is the same as a payload size of DCI format 1, DCI format 2A, DCI format 2, DCI format 1D, DCI format 1B, DCI format 2B, DCI format 2C, or DCI format 2D. Further, optionally, the relay UE determines, based on a transmission mode of the relay UE, specific DCI whose payload size is equal to the payload size of the DCI used to schedule the remote UE. For example, when the transmission mode of the relay UE is 1, the payload size of the DCI used to schedule the remote UE is the same as the payload size of DCI format 1. When the transmission mode of the relay UE is 3, the payload size of the DCI used to schedule the remote UE is the same as the payload size of DCI format 2A. The payload size of DCI format 0 is different from the payload size of DCI format 1, DCI format 2A, DCI format 2, DCI format 1D, DCI format 1B, DCI format 2B, DCI format 2C, or DCI format 2D.

(4) In a fourth possible implementation solution, the first information includes the PDCCH that carries the first control information. The PDCCH that carries the first control infor-

TABLE 13

| Mapping relationship between a PDCCH that carries first control information and a device identity | | | | |
|---|---|---|---|---|
| PDCCH 0 | PDCCH 1 | PDCCH 1 | PDCCH 1 | PDCCH 1 |
| Device identity | ID of relay UE | ID of remote UE 1 | ID of remote UE 2 | ID of remote UE 3 | ID of remote UE 4 |

When the network device needs to send the first control information used to schedule the relay UE, the network device may send the first control information in the location of the PDCCH 0 in a subframe. Similarly, when the network device needs to send the first control information used to schedule the remote UE 4, the network device may send the first control information in the location of the PDCCH 1 in a subframe. In this case, when detecting or successfully receiving the first control information, the relay UE may first determine the PDCCH that carries the first control information, to determine a type of device scheduled by using the first control information.

In Table 13, PDCCHs that carry first control information for the second-type device are the same. In an optional solution, PDCCHs that carry the first control information used to schedule the at least one remote UE included in the second-type device may be different, and it is ensured that the PDCCHs are different from the PDCCH that carries the first control information for scheduling the first-type device.

In practice, one search space includes a plurality of candidate PDCCHs, some of the candidate PDCCHs are used to carry first control information for scheduling the relay UE, and other candidate PDCCHs are used to carry first control information for scheduling the remote UE. Optionally, the search space is determined based on the RNTI for the relay UE.

In a possible solution, at an aggregation level, an index of a candidate PDCCH in the search space is represented by m, where m=0, 1, . . . , M−1, and M is a quantity of candidate PDCCHs in the search space.

In this case, the candidate PDCCH that carries the first control information for scheduling the remote UE is a candidate PDCCH m1, where m1=0, 1, . . . , M1−1, and M1<M. The candidate PDCCH that carries the first control information for scheduling the relay UE is a candidate PDCCH m2, where m2=M1, M1+1, . . . , M−1. M1 may be specified in a standard protocol, or configured by the network device, or determined by the relay UE. When M1 is determined by the relay UE, the relay UE needs to send indication information to the network device, to indicate M1.

Optionally, for different aggregation levels, values of M1 may be different.

Optionally, M1 is M multiplied by a scale factor k, where 0<k≤1. For different aggregation levels, scale factors are the same.

If the relay UE determines that the PDCCH that carries the first control information is the candidate PDCCH m1, the relay UE determines that the first control information carried by the PDCCH is for scheduling the remote UE. If the relay UE determines that the PDCCH that carries the first control information is the candidate PDCCH m2, the relay UE determines that the first control information carried by the PDCCH is for scheduling the relay UE.

In another possible solution, at an aggregation level, an index of a candidate PDCCH in the search space is represented by in, where m=0, 1, . . . , M−1. In a first case, M is a quantity of candidate PDCCHs in the search space. Alternatively, in a second case, M=max{M', $\lfloor N_{CCE}/L \rfloor$}, M' is a quantity of candidate PDCCHs in the search space, $N_{CCE}$ is a total quantity of CCEs in one subframe, and L is an aggregation level.

In this case, the candidate PDCCH that carries the first control information for scheduling the remote UE is a candidate PDCCH m that satisfies the following formula:

$m$ mod 2=0(mod represents a modulo operation)

In addition, the candidate PDCCH that carries the first control information for scheduling the relay UE is a candidate PDCCH m that satisfies the following formula:

$m$ mod 2=1

When the relay UE determines that the PDCCH that carries the first control information is the candidate PDCCH in, and m is an even number, the relay UE determines that the first control information carried by the PDCCH is for scheduling the remote UE. When the relay UE determines that the PDCCH that carries the first control information is the candidate PDCCH in, and m is an odd number, the relay UE determines that the first control information carried by the PDCCH is for scheduling the relay UE.

Optionally, candidate PDCCHs that carry first control information for scheduling different types of devices are in search space determined by using a same RNTI, for example, an RNTI allocated by the network device to the relay UE.

(5) In a fifth possible implementation solution, the first information may include the subframe in which the first control information is located. The subframe in which the first control information is located may be used to determine that the first control information is used to schedule the first-type device or the second-type device.

For example, the network device allocates different subframes to the first-type device and the second-type device, to send the first control information. Four remote UEs communicate with the network device by using the relay UE. Table 14 shows a mapping relationship between a subframe in which first control information is located and a device identity. First control information for the first-type device is sent in a subframe 0, and first control information for the second-type device is sent in a subframe 1.

TABLE 14

Mapping relationship between a subframe in which first control information is located and a device identity

|  | Subframe 0 | Subframe 1 | Subframe 1 | Subframe 1 | Subframe 1 |
|---|---|---|---|---|---|
| RNTI 0 | ID of relay UE | ID of remote UE 1 | ID of remote UE 2 | ID of remote UE 3 | ID of remote UE 4 |

When the network device needs to send the first control information used to schedule the relay UE, the network device may send the first control information in a location of the "subframe 0". Similarly, when the network device needs to send the first control information used to schedule the remote UE 4, the network device may send the first control information in a location of the "subframe 1". In this case, when detecting and receiving the first control information, the relay UE may first determine the subframe in which the first control information is located, to determine a type of device scheduled by using the first control information.

In Table 14, the first control information for the second-type device is located in a same subframe. In an optional solution, the first control information for the at least one remote UE included in the second-type device may be located in different subframes, and it is ensured that the subframes are different from a subframe in which the first control information for the first-type device is located.

For another example, a subframe set for transmitting the first control information used to schedule the relay UE does not overlap with a subframe set for transmitting the first control information for scheduling the remote UE. For example, some subframe sets are used to transmit the first control information used to schedule the relay UE, and other subframe sets are used to transmit the first control information used to schedule the remote UE.

In a possible solution, a subframe available for transmitting control information within a specified time period is represented by Si, where i=0, 1, . . . , N−1, and N is a quantity of subframes available for transmitting the control information within the specified time period. The subframes available for transmitting the control information in the specified time period may be, for example, downlink subframes in one radio frame or non-uplink subframes (including a downlink subframe and a special subframe) in one radio frame.

In this case, a subframe set used to transmit the PDCCH that carries the first control information for scheduling the remote UE is Sj, where j=0, 1, . . . , J−1, and J<N. A subframe set used to transmit the PDCCH that carries the first control information for scheduling the relay UE is Sj, where j=J, J+1, . . . , N−1. J may be specified in a standard protocol, or configured by the network device, or preconfigured, or determined by the relay UE. When J is determined by the relay UE, the relay UE needs to send indication information to the network device, to indicate J.

Optionally, for different TDD UL/DL configurations, values of J may be different.

Optionally, J is N multiplied by a scale factor k, where 0<k≤1. For different TDD UL/DL configurations, scale factors are the same.

If the relay UE determines that the first control information is in the subframe Sj (j=0, 1, . . . , J−1), the relay UE determines that the first control information carried by the PDCCH is for scheduling the remote UE. If the relay UE determines that the first control information is in the subframe Sj (j=J, J+1, ..., N−1), the relay UE determines that the first control information carried by the PDCCH is for scheduling the relay UE.

In another possible solution, a subframe available for transmitting control information within a specified time period is represented by Si, where i=0, 1, ..., N−1, and N is a quantity of subframes available for transmitting the control information within the specified time period. The subframes available for transmitting the control information in the specified time period may be, for example, downlink subframes in one radio frame or non-uplink subframes (including a downlink subframe and a special subframe) in one radio frame.

In this case, a subframe set used to transmit the PDCCH that carries the first control information for scheduling the remote UE is Si that satisfies the following formula:

$i \bmod 2 = 0$ (mod represents a modulo operation)

A subframe set used to transmit the PDCCH that carries the first control information for scheduling the relay UE is Si that satisfies the following formula:

$i \bmod 2 = 1$

If the relay UE determines that the PDCCH that carries the first control information is in the subframe Si, where i is an even number, the relay UE determines that the first control information carried by the PDCCH is for scheduling the remote UE. If the relay UE determines that the first control information is carried in the subframe Si, and i is an odd number, the relay UE determines that the first control information carried by the PDCCH is for scheduling the relay UE.

405. The relay UE transmits data based on the first control information.

When the relay UE determines, in step 403, that the first control information is used to schedule the first-type device, because the first-type device is the relay UE, the relay UE transmits data based on the first control information. For example, when resource information included in the first control information is used to send data to first remote UE, the relay UE transmits data to the first remote UE in the resource information. Alternatively, when resource information included in the first control information is used to receive data sent by second remote UE, the relay UE receives, in the resource information, the data sent by the second remote UE. The first remote UE or the second remote UE is any one of the at least one remote UE.

Optionally, when the first control information includes a parameter used for data transmission, the relay UE transmits data based on the parameter.

Optionally, when the first control information includes a parameter and the resource information that are used for data transmission, the relay UE transmits data based on the parameter and the resource information.

406. The relay UE determines second information.

This step is optional. When the relay UE determines, in step 403, that the first control information is used to schedule the second-type device, the relay UE determines the second information, so as to determine that the first control information is used to schedule target remote UE. The target remote UE is one of the at least one second device included in the second-type device.

The second information includes at least one of the following: second indication information included in the first control information, the radio network temporary identifier for scrambling the first control information, the payload size of the first control information, the PDCCH that carries the first control information, or the subframe in which the first control information is located.

Each parameter included in the second information herein may be determined based on a corresponding parameter included in the first information in step 402. It should be noted that a difference between the second information and the first information is that a parameter included in the second information is used to determine, from the second-type device, the target remote UE scheduled by using the first control information, that is, the target remote UE is any one of the at least one remote UE included in the second-type device.

407. The relay UE determines that the first control information is used to schedule target remote UE, where the target remote UE is any one of the at least one remote UE included in the second-type device.

When the relay UE determines, in step 403, that the first control information is used to schedule the second-type device, the relay UE determines the target remote UE based on the second information.

The following provides description by using an example in which the second information may include several cases.

(1) In a first possible implementation solution, the second information includes the radio network temporary identifier for scrambling the first control information and the second indication information included in the first control information. The relay UE determines, based on the radio network temporary identifier for scrambling the first control information and the second indication information included in the first control information, that the first control information is used to schedule the target remote UE. Specifically, the relay UE determines, based on a mapping relationship between a radio network temporary identifier and a device and a mapping relationship between second indication information included in the first control information and a device, target remote UE identity corresponding to both the radio network temporary identifier for scrambling the first control information and the second indication information included in the first control information, and determines that the first control information is used to schedule target remote UE indicated by the target remote UE identity. The device identity includes an identity of each of the at least one remote UE.

For example, a device identity of each remote UE of the second-type device is represented by identity. In a possible method, second indication information included in the first control mod n information for scheduling the second-type device is identity mod n. The RNTI for scrambling the first control information is $RNTI_i$, where $i = \lfloor identity/n \rfloor$, and a value of $RNTI_i$ is configured by the network device. n may be specified in a standard protocol, or configured by the network device, or preconfigured, or determined by the relay UE. When n is determined by the relay UE, the relay UE needs to send indication information to the network device, to indicate n.

It is assumed that n=4. Eight remote UEs communicate with the network device by using the relay UE. In table 15, identities of remote UEs are 0, 1, ..., and 7. In this case, one target remote UE can be uniquely determined from a plurality of remote UEs by using the second indication information and the RNTI.

TABLE 15

Mapping relationship between second indication
information, an RNTI, and a device identity

| | Second indication information 0 | Second indication information 1 | Second indication information 2 | Second indication information 3 |
|---|---|---|---|---|
| RNTI 0 | Identity = 0 | Identity = 1 | Identity = 2 | Identity = 3 |
| RNTI 1 | Identity = 4 | Identity = 5 | Identity = 6 | Identity = 7 |

When the network device needs to send the first control information used to schedule the remote UE whose identity is 5, the network device may scramble the first control information based on the "RNTI 1" corresponding to the remote UE, and write the second indication information 1 into the first control information. In this case, when detecting or receiving the first control information, the relay UE may first determine an RNTI for successfully receiving the first control information, and then determine the second indication information included in the first control information, to determine a target remote UE scheduled by using the first control information.

In another possible method, second indication information included in the first control information for scheduling the second-type device is ⌊identity/n⌋. The RNTI for scrambling is $RNTI_i$, where i=identity mod n, and a value of $RNTI_i$ is configured by the network device. n may be specified in a standard protocol, or configured by the network device, or preconfigured, or determined by the relay UE. When n is determined by the relay UE, the relay UE needs to send indication information to the network device, to indicate n.

It is assumed that n=4. Eight remote UEs communicate with the network device by using the relay UE. In Table 16, there are eight remote UEs whose identities are 0, 1, . . . , and 7.

TABLE 16

Mapping relationship between second indication
information, an RNTI, and a device identity

| | Second indication information 0 | Second indication information 1 |
|---|---|---|
| RNTI 0 | Identity = 0 | Identity = 4 |
| RNTI 1 | Identity = 1 | Identity = 5 |
| RNTI 2 | Identity = 2 | Identity = 6 |
| RNTI 3 | Identity = 3 | Identity = 7 |

In this embodiment of the present invention, a quantity of bits occupied by the second indication information in the first control information is not limited. A quantity of RNTIs corresponding to the second-type device is not limited, either. This is merely an example for description. The mapping relationship in this possible implementation solution is not limited in this embodiment of the present invention.

(2) In a second possible implementation solution, the second information includes the radio network temporary identifier for scrambling the first control information and the subframe in which the first control information is located. The relay UE determines, based on the radio network temporary identifier for scrambling the first control information and the subframe in which the first control information is located, that the first control information is used to schedule the target remote UE. Specifically, the relay UE determines, based on a mapping relationship between a radio network temporary identifier and a device identify and a mapping relationship between a subframe in which control information is located and a device identify, target remote UE identity corresponding to both the radio network temporary identifier for scrambling the first control information and the subframe in which the first control information is located, and determines that the first control information is used to schedule target remote UE indicated by the target remote UE identity. The device identity includes an identity of each of the at least one remote UE.

For example, a device identity of each remote UE of the second-type device is represented by identity. A subframe available for transmitting control information within a specified time period is represented by Si, where i=0, 1, . . . , N−1, and N is a quantity of subframes available for transmitting the control information within the specified time period. The subframes available for transmitting the control information in the specified time period may be, for example, downlink subframes in one radio frame or non-uplink subframes (including a downlink subframe and a special subframe) in one radio frame.

In a possible method, a subframe set in which the first control information for the second-type device is located is Si that satisfies the following formula:

Si mod n=identity mod n(mod represents a modulo operation)

The RNTI for scrambling is $RNTI_i$, where i=⌊identity/n⌋, and a value of $RNTI_i$ is configured by the network device. n may be specified in a standard protocol, or configured by the network device, or preconfigured, or determined by the relay UE. When n is determined by the relay UE, the relay UE needs to send indication information to the network device, to indicate n.

Optionally, for different TDD UL/DL (Time Division Duplexing Uplink/Downlink) configurations, values of n may be different.

Optionally, n is N multiplied by a scale factor k, where 0<k≤1. For different TDD UI/DL configurations, scale factors are the same.

It is assumed that n=4 and N=8. Eight remote UEs communicate with the network device by using the relay UE. In Table 17, identities of remote UEs are 0, 1, . . . , and 7.

TABLE 17

Mapping relationship between a subframe in which first control information is located, an RNTI, and a device identity

| | S0 | S1 | S2 | S3 | S4 | S5 | S6 | S7 |
|---|---|---|---|---|---|---|---|---|
| RNTI 0 | Identity = 0 | Identity = 1 | Identity = 2 | Identity = 3 | Identity = 0 | Identity = 1 | Identity = 2 | Identity = 3 |
| RNTI 1 | Identity = 4 | Identity = 5 | Identity = 6 | Identity = 7 | Identity = 4 | Identity = 5 | Identity = 6 | Identity = 7 |

It can be learned that one remote UE may be scheduled by using two types of first control information, which is specifically implemented by using different RNTIs for scrambling the first control information or different subframes in which the first control information is located.

(3) In a third possible implementation solution, the second information includes the second indication information included in the first control information and the subframe in Optionally, for different TDD UL/DL configurations, values of n may be different.

Optionally, n is N multiplied by a scale factor k, where $0 < k \leq 1$. For different TDD UL/DL configurations, scale factors are the same.

It is assumed that n=4 and N=8. Eight remote UEs communicate with the network device by using the relay UE. In Table 18, there are eight remote UEs whose identities are 0, 1, . . . , and 7.

TABLE 18

Mapping relationship between second indication information, a subframe in which first control information is located, and a device identity

|  | S0 | S1 | S2 | S3 | S4 | S5 | S6 | S7 |
| --- | --- | --- | --- | --- | --- | --- | --- | --- |
| Second indication information 0 | Identity = 0 | Identity = 1 | Identity = 2 | Identity = 3 | Identity = 0 | Identity = 1 | Identity = 2 | Identity = 3 |
| Second indication information 1 | Identity = 4 | Identity = 5 | Identity = 6 | Identity = 7 | Identity = 4 | Identity = 5 | Identity = 6 | Identity = 7 | which the first control information is located. The relay UE determines, based on the second indication information included in the first control information and the subframe in which the first control information is located, that the first control information is used to schedule the target remote UE. Specifically, the relay UE determines, based on a mapping relationship between indication information and a device identify and a mapping relationship between a subframe in which control information is located and a device identify, target remote UE identity corresponding to both second indication information in the first control information and the subframe in which the first control information is located, and determines that the first control information is used to schedule target remote UE indicated by the target remote UE identity. The device identity includes an identity of each of the at least one remote UE.

For example, a device identity of each remote UE of the second-type device is represented by identity. A subframe available for transmitting control information within a specified time period, for example, downlink subframes in one radio frame, are represented by Si, where i=0, 1, . . . , N−1, and N is a quantity of subframes available for transmitting the control information within the specified time period, for example, the downlink subframes in one radio frame. The subframes available for transmitting the control information within the specified time period may be, for example, downlink subframes in one radio frame or non-uplink subframes (including a downlink subframe and a special subframe) in one radio frame, and are represented by Si, i=0, 1, . . . , N−1, where N is a sum of a quantity of downlink subframes and a quantity of special subframes in one radio frame.

In a possible method, a subframe set in which the first control information for the second-type device is located is Si that satisfies the following formula:

$$Si \bmod n = \text{identity} \bmod n \text{(mod represents a modulo operation)}$$

The second indication information in the first control information is $\lfloor \text{identity}/n \rfloor$. n may be specified in a standard protocol, or configured by the network device, or preconfigured, or determined by the relay UE. When n is determined by the relay UE, the relay UE needs to send indication information to the network device, to indicate n.

It can be learned that one remote UE may be scheduled by using two types of first control information, which is specifically implemented by using different second indication information included in the first control information or different subframes in which the first control information is located. This is merely an example for description. The mapping relationship in this possible implementation solution is not limited in this embodiment of the present invention.

(4) In a fourth possible implementation solution, the second information includes the radio network temporary identifier for scrambling the first control information and the PDCCH that carries the first control information. The relay UE determines, based on the radio network temporary identifier for scrambling the first control information and the PDCCH that carries the first control information, that the first control information is used to schedule the target remote UE. Specifically, the relay UE determines, based on a mapping relationship between a radio network temporary identifier and a device identify and a mapping relationship between a PDCCH that caries control information and a device identify, target remote UE identity corresponding to both the radio network temporary identifier and the PDCCH that caries the control information, and determines that the first control information is used to schedule target remote UE indicated by the target remote UE identity. The device identity includes an identity of each of the at least one remote UE.

For example, a device identity of each remote UE of the second-type device is represented by identity. At an aggregation level, an index of a candidate PDCCH is represented by m, where m=0, 1, . . . , M−1, and M is a quantity of candidate PDCCHs in the search space.

In a possible method, a PDCCH used to carry the first control information for the second-type device is a candidate PDCCH m satisfies the following formula:

$$m \bmod n = \text{identity} \bmod n \text{(mod represents a modulo operation)}$$

The RNTI for scrambling is $RNTI_i$, $i = \lfloor \text{identity}/n \rfloor$, and a value of $RNTI_i$ is configured by the network device, where $n \leq M$. n may be specified in a standard protocol, or configured by the network device, or determined by the relay UE.

When n is determined by the relay UE, the relay UE needs to send indication information to the network device, to indicate n.

Optionally, for different aggregation levels, values of n may be different.

Optionally, n is M multiplied by a scale factor k, where 0<k≤1. For different aggregation levels, scale factors are the same.

It is assumed that n=2 and M=4. Eight remote UEs communicate with the network device by using the relay UE. In Table 19, identities of remote UEs are 0, 1, . . . , and 7.

TABLE 19

Mapping relationship between a PDCCH that carries first control information, an RNTI, and a device identity

|        | PDCCH 0      | PDCCH 1      | PDCCH 2      | PDCCH 3      |
|--------|--------------|--------------|--------------|--------------|
| RNTI 0 | Identity = 0 | Identity = 1 | Identity = 0 | Identity = 1 |
| RNTI 1 | Identity = 2 | Identity = 3 | Identity = 2 | Identity = 3 |
| RNTI 2 | Identity = 4 | Identity = 5 | Identity = 4 | Identity = 5 |
| RNTI 3 | Identity = 6 | Identity = 7 | Identity = 6 | Identity = 7 |

It can be learned that one remote UE may be scheduled by using two types of first control information, which is specifically implemented by using different RNTIs for scrambling the first control information or different subframes in which the first control information is located. This is merely an example for description. The mapping relationship in this possible implementation solution is not limited in this embodiment of the present invention.

In still another possible implementation solution, the second information includes the second indication information included in the first control information. The relay UE determines, based on the second indication information included in the first control information, that the first control information is used to schedule the target remote UE. Specifically, the relay UE determines, based on a mapping relationship between second indication information included in the first control information and a device, an identity of a target device corresponding to the second indication information included in the first control information, and determines that the first control information is used to schedule the target device indicated by the identity of the target device.

In still another possible implementation solution, the second information includes the radio network temporary identifier for scrambling the first control information. The relay UE determines, based on the radio network temporary identifier for scrambling the first control information, that the first control information is used to schedule the target remote UE. Specifically, the relay UE determines, based on a mapping relationship between the radio network temporary identifier for scrambling the first control information and a device, an identity of a target device corresponding to the radio network temporary identifier that scrambles the first control information, and determines that the first control information is used to schedule the target device indicated by the identity of the target device.

408. The relay UE determines second control information based on the resource information that is used for data transmission and that is included in the first control information.

409. The relay UE sends the second control information to the target remote UE.

410. The target remote UE transmits data based on the second control information.

For steps 408 to 410, refer to the detailed description of steps 206 to 208 in the embodiment shown in FIG. 2, and details are not described herein again.

It should be noted that, in the embodiments shown in FIG. 2 and FIG. 4, a device identity of remote UE may be an index of a second identity of the remote UE in a destination list reported by the relay UE, a local identity (Local ID) of the remote UE, a proximity service identity (ProSe UE ID) of the remote UE, or a layer-2 identity (Layer-2 ID) of the remote UE. The second identity of the remote UE is a local identity of the remote UE, a proximity service identity of the remote UE, or a layer-2 identity of the remote UE.

The device identity of the remote UE may be the index of the second identity of the remote UE in the destination list reported by the relay UE. Specifically, the relay UE indicates, in the destination list, one or more target devices that communicate with the relay UE, and each target device is identified by using a second identity. For example, as shown in Table 20, the relay UE indicates, in the destination list (destinationInfoList), one or more destinations that perform sidelink communication, each destination is identified by using a ProSe UE ID. In other words, the destination list (destinationInfoList) includes one or more ProSe UE IDs, and each remote UE has a ProSe UE ID of the remote UE. In this case, a device identity of the remote UE may be an index of a second identity of the remote UE in the destination list reported by the relay UE. To be specific, a device identity of the remote UE corresponding to a ProSe UE ID 5 is 0.

TABLE 20

| Second identity of each remote UE | Device identity of each remote UE |
|-----------------------------------|-----------------------------------|
| ProSe UE ID 5                     | Index 0                           |
| ProSe UE ID 3                     | Index 1                           |
| ProSe UE ID 4                     | Index 2                           |

It should be further noted that, in the method embodiments corresponding to FIG. 2 and FIG. 4, which device is scheduled by using the first control information is determined by the relay UE. For ease of description, a mapping relationship between first information and an ID of the relay UE is used for description. In practice, the relay UE may not need to determine, based on the ID of the relay UE, the first information corresponding to the relay UE. The relay UE may directly determine the first information corresponding to the relay UE. For example, the first information corresponding to the relay UE may be defined in a standard protocol, or the relay UE receives indication information, sent by the network device, of the first information corresponding to the relay UE.

It should be further noted that, in this embodiment of the present invention, the relay UE may determine, without performing steps 403, 404, and 405, which one of the at least one remote UE is scheduled by using the first control information. For a specific implementation process, refer to the specific descriptions of the corresponding steps in this embodiment, and details are not described herein again.

In this embodiment of the present invention, after receiving the first control information sent by the network device, the relay UE can determine, based on the first information related to the first control information, a type of device scheduled by using the first control information. In addition, when it is determined that the first control information is used to schedule the second-type device including the at least one remote UE, which one of the at least one remote UE is scheduled by using the first control information may continue to be determined.

Figure 5:
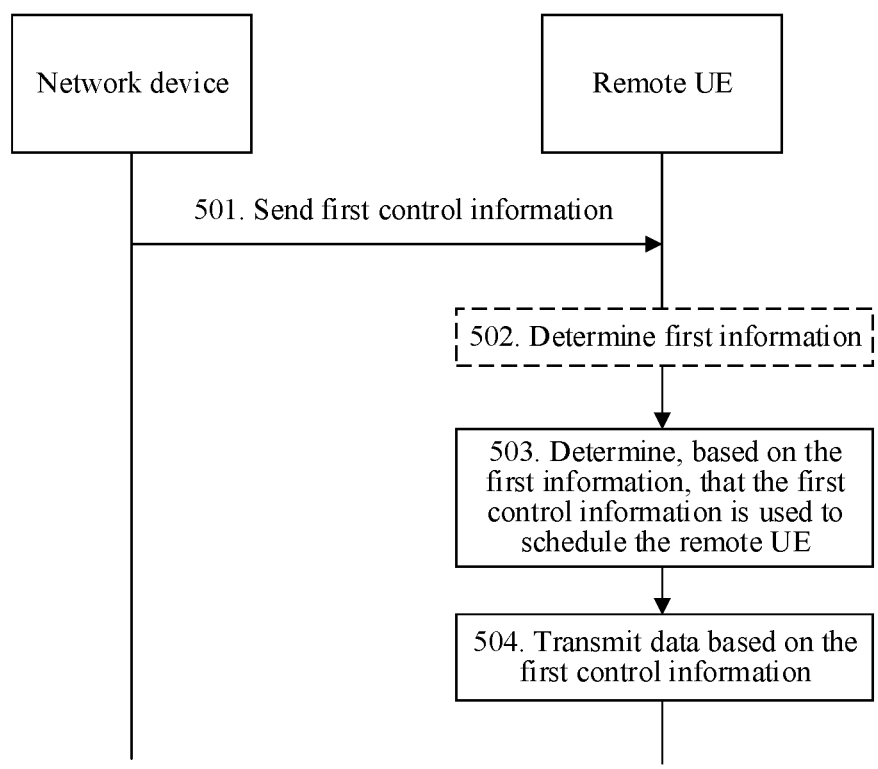
FIG. 5 shows another control information processing method according to an embodiment of the present invention.

In another possible system architecture diagram, remote UE may receive first control information sent by a network device. With reference to FIG. 1, remote UE 1 and remote UE 2 may receive control plane signaling sent by the network device. The control plane signaling herein includes the first control information in this embodiment of the present invention. FIG. 5 shows a control information processing method according to an embodiment of the present invention. As shown in FIG. 5, a second device and a network device are included in this embodiment. For example, the second device is remote UE. In this embodiment, the remote UE communicates with the network device by using relay UE. Communication herein means transmitting data to the network device by using the relay UE. The remote UE in FIG. 5 may determine whether first control information is used to schedule the remote TIE.

501. The network device sends the first control information.

The first control information includes resource information used for data transmission. The resource information herein includes at least one of frequency domain information of a resource and time domain information of the resource.

Optionally, in another case, the first control information includes a parameter for data transmission, and excludes the resource information for data transmission. In still another case, the first control information includes a parameter and the resource information that are used for data transmission. The parameter for data transmission mentioned herein may include but is not limited to a power parameter and a modulation and coding scheme (MCS).

Correspondingly, the remote UE receives the first control information sent by the network device. Optionally, the remote UE may also detect or monitor the first control information sent by the network device.

502. The remote UE determines first information.

This step is optional. The first information herein is information related to the first control information. For example, the first information includes at least one of the following: a payload size of the first control information, a PDCCH that carries the first control information, and a subframe in which the first control information is located.

In an optional embodiment, the first information further includes at least one of the first control information and a radio network temporary identifier for scrambling the first control information. For example, the first information may include the PDCCH that carries the first control information and the first control information. Alternatively, the first information may include the subframe in which the first control information is located and the radio network temporary identifier for scrambling the first control information.

For each parameter that may be included in the first information, refer to the detailed description in the embodiment shown in FIG. 2, and details are not described herein again. It should be noted that a parameter or a parameter combination that may be included in the first information in the embodiment shown in FIG. 5 is not affected by the first information in the embodiment shown in FIG. 2.

503. The remote UE determines, based on the first information, that the first control information is used to schedule the remote UE.

Specifically, there are many cases of the parameter and the parameter combinations included in the first information, several cases are used as examples herein. However, parameters or parameter combinations that are not described by using examples also fall within the protection scope of this embodiment of the present invention.

(1) In a first possible implementation solution, the first information includes the payload size of the first control information.

(2) In a second possible implementation solution, the first information includes the PDCCH that carries the first control information.

(3) In a third possible implementation solution, the first information includes the subframe in which the first control information is located.

For the first possible implementation solution, the second possible implementation solution, and the third possible implementation solution, implementation processes are basically the same. It is assumed that the first information includes a first parameter, and the first parameter is the payload size of the first control information, the PDCCH that carries the first control information, or the subframe in which the first control information is located. When detecting the first control information, the remote LIE determines whether a value of the first parameter of the first control information is the same as a target value of a first parameter corresponding to the remote UE. If the values are the same, the remote UE determines that the first control information is used to schedule the remote UE; or if the values are different, the remote UE determines that the first control information is not used to schedule the remote UE.

When the first parameter is the payload size, a target value of a payload size corresponding to the remote UE is a target payload size. When the first parameter is the PDCCH that carries the first control information, a target value of a PDCCH that carries the first control information and that corresponds to the remote UE is a target PDCCH. When the first parameter is the subframe in which the first control information is located, a target value of a subframe in which the first control information is located and that corresponds to the remote UE is a target subframe.

Optionally, the target payload size, the target PDCCH, or the target subframe that corresponds to the remote UE may be determined by using the network device.

(4) In a fourth possible implementation solution, the first information includes the radio network temporary identifier for scrambling the first control information and first indication information included in the first control information. The remote UE determines, based on the radio network temporary identifier for scrambling the first control information and the first indication information included in the first control information, that the first control information is used to schedule the remote UE.

In specific implementation, the remote UE determines a target radio network temporary identifier and target indication information; and when the radio network temporary identifier for scrambling the first control information is the target radio network temporary identifier, and the second indication information included in the first control information is the target indication information, the remote UE determines that the first control information is used to schedule the remote UE.

Optionally, the target radio network temporary identifier and the target indication information are information that is related to the first control information and that corresponds to the remote UE, and the information may be determined by using the network device.

(5) In a fifth possible implementation solution, the first information includes the radio network temporary identifier for scrambling the first control information and the subframe in which the first control information is located. The remote UE determines, based on the radio network temporary identifier for scrambling the first control information and the subframe in which the first control information is located, that the first control information is used to schedule the remote UE.

In specific implementation, the remote UE determines a target radio network temporary identifier and a target subframe set, and the target subframe set includes at least one target subframe; and when the radio network temporary identifier for scrambling the first control information is the target radio network temporary identifier, and the subframe in which the first control information is located belongs to the target subframe set, the remote UE determines that the first control information is used to schedule the remote UE.

Optionally, the target radio network temporary identifier and the target subframe set are information that is related to the first control information and that corresponds to the remote UE, and the information may be determined by using the network device.

(6) In a sixth possible implementation solution, the first information includes first indication information included in the first control information and the subframe in which the first control information is located. The remote UE determines, based on the first indication information included in the first control information and the subframe in which the first control information is located, that the first control information is used to schedule the remote UE.

In specific implementation, the remote UE determines target indication information and a target subframe set, and the target subframe set includes at least one target subframe. When the first indication information included in the first control information is the target indication information, and the subframe in which the first control information is located belongs to the target subframe set, the remote UE determines that the first control information is used to schedule the remote UE.

Optionally, the target indication information and the target subframe set are information that is related to the first control information and that corresponds to the remote UE, and the information may be determined by using the network device.

(7) In a seventh possible implementation solution, the first information includes the radio network temporary identifier for scrambling the first control information and the PDCCH that carries the first control information. The remote UE determines, based on the radio network temporary identifier for scrambling the first control information and the PDCCH that carries the first control information, that the first control information is used to schedule the remote UE.

In specific implementation, the remote UE determines a target radio network temporary identifier and a target PDCCH set, where the target PDCCH set includes at least one target PDCCH; and when the radio network temporary identifier for scrambling the first control information is the target radio network temporary identifier, and the PDCCH that carries the first control information belongs to the target PDCCH set, the remote UE determines that the first control information is used to schedule the remote UE.

Optionally, the target radio network temporary identifier and the target PDCCH set are information that is related to the first control information and that corresponds to the remote UE, and the information may be determined by using the network device.

504. The remote UE transmits data based on the first control information.

When the remote UE determines, in step 503, that the first control information is used to schedule the remote UE, target remote UE transmits data based on the first control information. For example, when resource information included in the first control information is used to send data to the relay UE, the target remote UE transmits data to the relay UE in the resource information. Alternatively, when resource information included in the first control information is used to receive data sent by the relay UE, the target remote UE receives, in the resource information, the data sent by the relay UE.

Optionally, when the first control information includes the parameter used for data transmission, the remote UE transmits data based on the parameter.

Optionally, when the first control information includes the parameter and the resource information that are used for data transmission, the remote UE transmits data based on the parameter and the resource information.

In this way, in this embodiment of the present invention, after receiving the first control information sent by the network device, the remote UE can determine, based on the first information related to the first control information, whether the first control information is used to schedule the remote UE.

Figure 6:
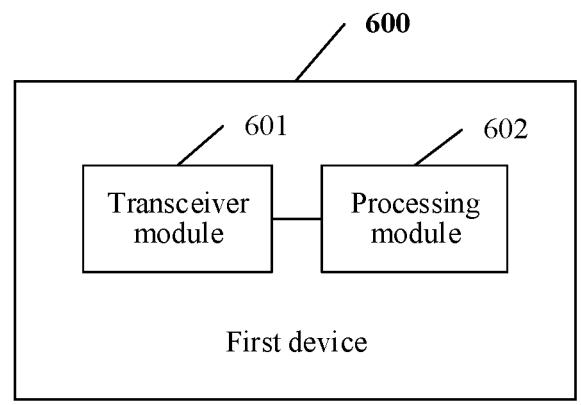
FIG. 6 is a schematic structural diagram of a first device according to an embodiment of the present invention.

FIG. 6 is a schematic structural diagram of a first device according to an embodiment of this application. Two possible solutions of the first device 600 are included in FIG. 6. Refer to the following specific description.

In a feasible solution, the first base station 600 includes:
a transceiver module 601, configured to receive first control information sent by a network device; and
a processing module 602, configured to determine, based on first information, that the first control information is used to schedule a target device, where the target device is one of the following devices: the first device and at least one second device, the at least one second device communicates with the network device by using the first device, and the first information includes at least one of the following: the first control information, a radio network temporary identifier for scrambling the first control information, a payload size of the first control information, a PDCCH that carries the first control information, and a subframe in which the first control information is located.

The processing module 602 is further configured to: when the target device is one of the at least one second device, determine second control information based on resource information that is used for data transmission and that is included in the first control information.

The transceiver module 601 is further configured to send the second control information to the target device, so that the target device transmits data based on the second control information.

The processing module 602 is further configured to: when the target device is the first device, transmit data based on the first control information.

In an optional embodiment, the first control information includes first indication information.

With respect to the determining, based on the first information, that the first control information is used to schedule a target device, the processing module 602 is specifically configured to determine, based on the first indication information included in the first control information, that the first control information is used to schedule the target device.

In an optional embodiment, the first control information includes second indication information.

With respect to the determining, based on the first information, that the first control information is used to schedule a target device, the processing module 602 is specifically configured to determine, based on the radio network temporary identifier for scrambling the first control information and the second indication information included in the first control information, that the first control information is used to schedule the target device;

determine, based on the radio network temporary identifier for scrambling the first control information and the subframe in which the first control information is located, that the first control information is used to schedule the target device;

determine, based on the second indication information included in the first control information and the subframe in which the first control information is located, that the first control information is used to schedule the target device; or determine, based on the radio network temporary identifier for scrambling the first control information and the PDCCH that carries the first control information, that the first control information is used to schedule the target device.

In an optional embodiment, with respect to the determining, based on the radio network temporary identifier for scrambling the first control information and the subframe in which the first control information is located, that the first control information is used to schedule the target device, the processing module 602 is specifically configured to:

determine, based on a mapping relationship between a radio network temporary identifier and a device identity and a mapping relationship between a subframe in which control information is located and a device identity, a target device identity corresponding to both the radio network temporary identifier for scrambling the first control information and the subframe in which the first control information is located, and determine that the first control information is used to schedule a target device indicated by the target device identity.

The device identity includes an identity of the first device and an identity of each of the at least one second device.

In an optional embodiment, with respect to the determining, based on the second indication information included in the first control information and the subframe in which the first control information is located, that the first control information is used to schedule the target device, the processing module 602 is specifically configured to:

determine, based on a mapping relationship between indication information and a device identity and a mapping relationship between a subframe in which control information is located and a device identity, a target device identity corresponding to both the second indication information and the subframe in which the first control information is located, and determine that the first control information is used to schedule a target device indicated by the target device identity.

The device identity includes an identity of the first device and an identity of each of the at least one second device.

In an optional embodiment, with respect to the determining, based on the radio network temporary identifier for scrambling the first control information and the PDCCH that carries the first control information, that the first control information is used to schedule the target device, the processing module 602 is specifically configured to:

determine, based on a mapping relationship between a radio network temporary identifier and a device identity and a mapping relationship between a PDCCH that carries control information and a device identity, a target device identity corresponding to both the radio network temporary identifier for scrambling the first control information and the PDCCH that carries the first control information, and determine that the first control information is used to schedule a target device indicated by the target device identity.

The device identity includes an identity of the first device and an identity of each of the at least one second device.

It can be understood that, for a specific implementation and a corresponding beneficial effect of the function blocks included in the first device in this feasible solution, refer to the specific descriptions in the embodiment in FIG. 2, and details are not described herein again.

In another feasible solution, the first base station 600 includes:

a transceiver module 601, configured to receive first control information sent by a network device; and a processing module 602 configured to determine, based on first information, that the first control information is used to schedule a first-type device or a second-type device, where the first-type device is the first device, and the second-type device includes at least one second device.

The at least one second device communicates with the network device by using the first device; and the first information includes: first indication information included in the first control information, a radio network temporary identifier for scrambling the first control information, a payload size of the first control information, a PDCCH that carries the first control information, or a subframe in which the first control information is located.

In an optional embodiment, the processing module 602 is further configured to: when the first control information is used to schedule the first-type device, transmit data based on the first control information.

In an optional embodiment, the processing module 602 is further configured to: when the first control information is used to schedule the second-type device, determine that the first control information is used to schedule a target device, where the target device is one of the at least one second device included in the second-type device.

The processing module 602 is further configured to determine second control information based on resource information that is used for data transmission and that is included in the first control information.

The transceiver module 601 is further configured to send the second control information to the target device, so that the target device transmits data based on the second control information.

In an optional embodiment, with respect to the determining that the first control information is used to schedule a target device, the processing module 602 is specifically configured to:

determine, based on second information, that the first control information is used to schedule the target device.

The second information includes at least one of the following: second indication information included in the first control information, the radio network temporary identifier for scrambling the first control information, the payload size of the first control information, the PDCCH that carries the first control information, or the subframe in which the first control information is located.

In an optional embodiment, with respect to the determining, based on the second information, that the first control information is used to schedule a target device, the processing module 602 is specifically configured to:

determine, based on the radio network temporary identifier for scrambling the first control information and the second indication information included in the first control information, that the first control information is used to schedule the target device;

determine, based on the radio network temporary identifier for scrambling the first control information and the subframe in which the first control information is located, that the first control information is used to schedule the target device;

determine, based on the second indication information included in the first control information and the subframe in which the first control information is located, that the first control information is used to schedule the target device; or determine, based on the radio network temporary identifier for scrambling the first control information and the PDCCH that carries the first control information, that the first control information is used to schedule the target device.

In an optional embodiment, with respect to the determining, based on the radio network temporary identifier for scrambling the first control information and the subframe in which the first control information is located, that the first control information is used to schedule the target device, the processing module 602 is specifically configured to:

determine, based on a mapping relationship between a radio network temporary identifier and a device identity and a mapping relationship between a subframe in which control information is located and a device identity, a target device identity corresponding to both the radio network temporary identifier for scrambling the first control information and the subframe in which the first control information is located, and determine that the first control information is used to schedule a target device indicated by the target device identity.

The device identity includes an identity of each of the at least one second device.

In an optional embodiment, with respect to the determining, based on the second indication information included in the first control information and the subframe in which the first control information is located, that the first control information is used to schedule the target device, the processing module 602 is specifically configured to:

determine, based on a mapping relationship between indication information and a device identity and a mapping relationship between a subframe in which control information is located and a device identity, a target device identity corresponding to both the second indication information and the subframe in which the first control information is located, and determine that the first control information is used to schedule a target device indicated by the target device identity.

The device identity includes an identity of each of the at least one second device.

In an optional embodiment, with respect to the determining, based on the radio network temporary identifier for scrambling the first control information and the PDCCH that carries the first control information, that the first control information is used to schedule the target device, the processing module 602 is specifically configured to:

determine, based on a mapping relationship between a radio network temporary identifier and a device identity and a mapping relationship between a PDCCH that carries control information and a device identity, a target device identity corresponding to both the radio network temporary identifier for scrambling the first control information and the PDCCH that carries the first control information, and determine that the first control information is used to schedule a target device indicated by the target device identity.

The device identity includes an identity of each of the at least one second device.

In an optional embodiment, the first information is the PDCCH that carries the first control information.

With respect to the determining, based on the first information, that the first control information is used to schedule a first-type device or a second-type device, the processing module 602 is specifically configured to:

determine, based on a mapping relationship between a PDCCH that carries control information and a device type, a target device type corresponding to the PDCCH that carries the first control information, and determine that the first control information is used to schedule a type of device indicated by the target device type.

The device type includes the first-type device and the second-type device.

In an optional embodiment, the first information is the subframe in which the first control information is located.

With respect to the determining, based on the first information, that the first control information is used to schedule a first-type device or a second-type device, the processing module 602 is specifically configured to:

determine, for the first device based on a mapping relationship between a subframe in which control information is located and a device type, a target device type corresponding to the subframe in which the first control information is located, and determine that the first control information is used to schedule a type of device indicated by the target device type.

The device type includes the first-type device and the second-type device.

It can be understood that, for a specific implementation and a corresponding beneficial effect of the function blocks included in the first device in this feasible solution, refer to the specific descriptions in the embodiment in FIG. 4, and details are not described herein again.

Figure 7:
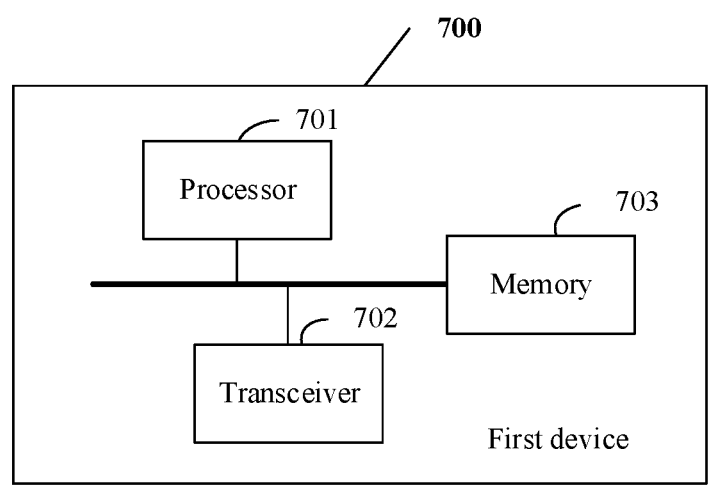
FIG. 7 is a schematic structural diagram of another first device according to an embodiment of the present invention.

The first device in the embodiment shown in FIG. 6 may be implemented as a first device 700 shown in FIG. 7. FIG. 7 is a schematic structural diagram of another first device according to an embodiment of the present invention. The first device 700 shown in FIG. 7 includes a processor 701 and a transceiver 702. The transceiver 702 is configured to support information transmission between the first device 700 and the network device or the second device in the foregoing embodiment. The processor 701 and the transceiver 702 are communicatively connected, for example, being connected by using a bus. The first device 700 may further include a memory 703. The memory 703 is configured to store program code and data that are executed by the first device 700, and the processor 701 is configured to execute the application program code stored in the memory 703, so as to implement an action of the first device provided in any embodiment shown in FIG. 2 or FIG. 4.

It should be noted that, in actual application, the first device may include one or more processors, and a structure of the first device 700 does not constitute a limitation on this embodiment of this application.

The processor 701 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field programmable logic gate array (FPGA), generic array logic (GAL), or any combination thereof.

The memory 703 may include a volatile memory such as a random access memory (RAM), or the memory 703 may include a non-volatile memory such as a read-only memory (ROM), a flash memory, a hard disk drive (HDD), or a solid-state drive (SSD), or the memory 703 may include a combination of the foregoing types of memories.

The memory 703 may include a volatile memory (volatile memory) such as a random access memory (random access memory, RAM), or the memory 703 may include a non-volatile memory (non-volatile memory) such as a read-only memory (read-only memory, ROM), a flash memory (flash memory), a hard disk drive (hard disk drive, HDD), or a solid-state drive (solid-state drive, SSD), or the memory 703 may include a combination of the foregoing types of memories.

An embodiment of the present invention further provides a computer storage medium. The computer storage medium may be configured to store a computer software instruction used by the first device in the embodiment shown in FIG. 7, and the computer software instruction includes a program designed for performing the functions implemented by the first device in the foregoing embodiment. The storage medium includes but is not limited to, a flash memory, a hard disk, and a solid-state drive.

An embodiment of the present invention further provides a computer program product. When being run by a computing device, the computer program product may perform the control information processing method designed for the first device in the embodiment in FIG. 7.

Figure 8:
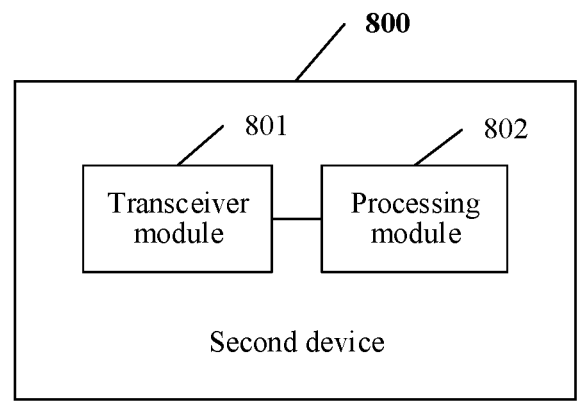
FIG. 8 is a schematic structural diagram of a second device according to an embodiment of the present invention.

FIG. 8 is a schematic structural diagram of a second device according to an embodiment of this application. The second device 800 shown in FIG. 8 includes:

a transceiver module 801, configured to detect first control information sent by a network device; and a processing module 802, configured to determine, based on first information, that the first control information is used to schedule the second device, where the first information includes at least one of the following: a payload size of the first control information, a PDCCH that carries the first control information, and a subframe in which the first control information is located.

The processing module 802 is further configured to transmit data based on the first control information.

In an optional embodiment, the first information further includes at least one of the first control information and a radio network temporary identifier for scrambling the first control information.

In an optional embodiment, the first control information includes first indication information.

With respect to the determining, based on the first information, that the first control information is used to schedule the second device, the processing module 802 is specifically configured to:

determine, based on the radio network temporary identifier for scrambling the first control information and the first indication information included in the first control information, that the first control information is used to schedule the second device;

determine, based on the radio network temporary identifier for scrambling the first control information and the subframe in which the first control information is located, that the first control information is used to schedule the second device;

determine, based on the first indication information included in the first control information and the subframe in which the first control information is located, that the first control information is used to schedule the second device; or determine, based on the radio network temporary identifier for scrambling the first control information and the PDCCH that carries the first control information, that the first control information is used to schedule the second device.

In an optional embodiment, with respect to the determining, based on the radio network temporary identifier for scrambling the first control information and the subframe in which the first control information is located, that the first control information is used to schedule the second device, the processing module 802 is specifically configured to:

determine, for the second device, a target radio network temporary identifier and a target subframe set, where the target subframe set includes at least one target subframe; and when the radio network temporary identifier for scrambling the first control information is the target radio network temporary identifier, and the subframe in which the first control information is located belongs to the target subframe set, determine, for the second device, that the first control information is used to schedule the second device.

In an optional embodiment, with respect to the determining, based on the first indication information included in the first control information and the subframe in which the first control information is located, that the first control information is used to schedule the second device, the processing module 802 is specifically configured to:

determine, for the second device, target indication information and a target subframe set, where the target subframe set includes at least one target subframe; and when the first indication information included in the first control information is the target indication information, and the subframe in which the first control information is located belongs to the target subframe set, determine, for the second device, that the first control information is used to schedule the second device.

In an optional embodiment, with respect to the determining, based on the radio network temporary identifier for scrambling the first control information and the PDCCH that carries the first control information, that the first control information is used to schedule the second device, the processing module 802 is specifically configured to:

determine, for the second device, a target radio network temporary identifier and a target PDCCH set, where the target PDCCH set includes at least one target PDCCH; and when the radio network temporary identifier for scrambling the first control information is the target radio network temporary identifier, and the PDCCH that carries the first control information belongs to the target PDCCH set, determine, for the second device, that the first control information is used to schedule the second device.

It can be understood that, for a specific implementation and a corresponding beneficial effect of the function blocks included in the second device in FIG. 8, refer to the specific descriptions in the embodiment in FIG. 5, and details are not described herein again.

Figure 9:
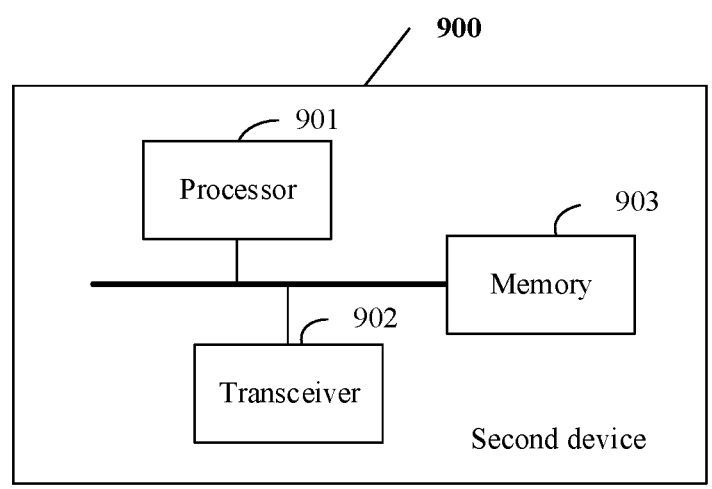
FIG. 9 is a schematic structural diagram of another second device according to an embodiment of the present invention.

The second device shown in FIG. 8 may be implemented as a second device 900 shown in FIG. 9. FIG. 9 is a schematic structural diagram of another second device according to an embodiment of the present invention. The second device 900 shown in FIG. 9 includes a processor 901 and a transceiver 902. The transceiver 902 is configured to support information transmission between the second device 900 and the network device or the first device in the foregoing embodiment. The processor 901 and the transceiver 902 are communicatively connected, for example, being connected by using a bus. The second device 900 may further include a memory 903. The memory 903 is configured to store program code and data that are executed by the second device 900, and the processor 901 is configured to execute the application program code stored in the memory 903, so as to implement an action of the second device provided in any embodiment shown in FIG. 5.

It should be noted that, in actual application, the second device may include one or more processors, and a structure of the second device 900 does not constitute a limitation on this embodiment of this application.

The processor 901 may be a CPU, an NP, a hardware chip, or any combination thereof. The hardware chip may be an ASIC, a PLD, or a combination thereof. The PLD may be a CPLD, an FPGA, GAL, or any combination thereof.

The memory 903 may include a volatile memory, such as a RAM; or the memory 903 may include a nonvolatile memory, such as a ROM, a flash memory, a hard disk, or a solid-state drive; or the memory may include a combination of the foregoing types of memories.

An embodiment of the present invention further provides a computer storage medium. The computer storage medium may be configured to store a computer software instruction used by the second device in the embodiment shown in FIG. 8, and the computer software instruction includes a program designed for performing the functions implemented by the second device in the foregoing embodiment. The storage medium includes but is not limited to, a flash memory, a hard disk, and a solid-state drive.

An embodiment of the present invention further provides a computer program product. When being run by a computing device, the computer program product may perform the control information processing method designed for the second device in the embodiment in FIG. 8.

In the specification, claims, and accompanying drawings of this application, the terms "first", "second", "third", "fourth" and so on are intended to distinguish between different objects but do not indicate a particular order. In addition, the terms "comprising", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Persons of ordinary skill in the art may understand that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the processes or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Persons of ordinary skill in the art may understand that all or some of the processes of the methods in the embodiments may be implemented by a computer program instructing relevant hardware. The program may be stored in a computer readable storage medium. When the program is run, the processes of the methods in the embodiments are performed. The foregoing storage medium may include: a magnetic disk, an optical disc, a read-only memory (ROM), or a random access memory (RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A control information processing method, comprising:
   receiving, by a first device, first control information sent by a network device;
   determining, by the first device based on first information, that the first control information is used to schedule a target device, wherein the target device is one of the following devices: the first device and at least one second device, the at least one second device communicates with the network device by using the first device, and the first information comprises at least one of the following: the first control information, a radio network temporary identifier for scrambling the first control information, a payload size of the first control information, a physical downlink control channel (PDCCH) that carries the first control information, and a subframe in which the first control information is located; and
   when the target device is the at least one second device, determining, by the first device, second control information based on resource information that is used for data transmission and that is included in the first control information, and sending the second control information to the target device, so that the target device transmits data based on the second control information, or when the target device is the first device, transmitting, by the first device, data based on the first control information,
   wherein the first control information comprises second indication information, and
   wherein the determining, by the first device based on the first information, that the first control information is used to schedule the target device comprises:
      determining, by the first device based on the radio network temporary identifier for scrambling the first control information and the second indication information in the first control information, that the first control information is used to schedule the target device;
      determining, by the first device based on the radio network temporary identifier for scrambling the first control information and the subframe in which the first control information is located, that the first control information is used to schedule the target device;

determining, by the first device based on the second indication information in the first control information and the subframe in which the first control information is located, that the first control information is used to schedule the target device; or determining, by the first device based on the radio network temporary identifier for scrambling the first control information and the PDCCH that carries the first control information, that the first control information is used to schedule the target device.

2. The method according to claim 1, wherein the first control information comprises first indication information, and wherein the determining, based on the first information, that the first control information is used to schedule the target device comprises determining, by the first device based on the first indication information in the first control information, that the first control information is used to schedule the target device.

3. The method according to claim 1, wherein the determining, by the first device based on the radio network temporary identifier for scrambling the first control information and the subframe in which the first control information is located, that the first control information is used to schedule the target device comprises determining, by the first device based on a mapping relationship between a radio network temporary identifier and a device identity and a mapping relationship between a subframe in which control information is located and a device identity, a target device identity corresponding to both the radio network temporary identifier for scrambling the first control information and the subframe in which the first control information is located, and determining that the first control information is used to schedule a target device indicated by the target device identity, and wherein the device identity comprises an identity of the first device and an identity of each of the at least one second device.

4. The method according to claim 1, wherein the determining, by the first device based on the second indication information in the first control information and the subframe in which the first control information is located, that the first control information is used to schedule the target device comprises determining, by the first device based on a mapping relationship between indication information and a device identity and a mapping relationship between a subframe in which control information is located and a device identity, a target device identity corresponding to both the second indication information and the subframe in which the first control information is located, and determining that the first control information is used to schedule a target device indicated by the target device identity, and wherein the device identity comprises an identity of the first device and an identity of each of the at least one second device.

5. The method according to claim 1, wherein the determining, by the first device based on the radio network temporary identifier for scrambling the first control information and the PDCCH that carries the first control information, that the first control information is used to schedule the target device comprises determining, by the first device based on a mapping relationship between a radio network temporary identifier and a device identity and a mapping relationship between a PDCCH that carries control information and a device identity, a target device identity corresponding to both the radio network temporary identifier for scrambling the first control information and the PDCCH that carries the first control information, and determining that the first control information is used to schedule a target device indicated by the target device identity, and wherein the device identity comprises an identity of the first device and an identity of each of the at least one second device.

6. A control information processing method, comprising:

receiving, by a first device, first control information sent by a network device;

determining, by the first device based on first information, that the first control information is used to schedule a first-type device or a second-type device, the first-type device being the first device, and the second-type device comprises at least one second device, the at least one second device communicating with the network device by using the first device, and the first information comprises at least one of: first indication information included in the first control information, a radio network temporary identifier for scrambling the first control information, a payload size of the first control information, a physical downlink control channel (PDCCH) that carries the first control information, and a subframe in which the first control information is located;

when the first control information is used to schedule the second-type device, determining, by the first device, that the first control information is used to schedule a target device, wherein the target device is one of the at least one second device included in the second-type device; and determining, by the first device, second control information based on resource information that is used for data transmission and that is included in the first control information, and sending the second control information to the target device, so that the target device transmits data based on the second control information, wherein the determining, by the first device, that the first control information is used to schedule the target device comprises determining, by the first device based on second information, that the first control information is used to schedule the target device, wherein the determining, by the first device based on the second information, that the first control information is used to schedule the target device comprises:

determining, by the first device based on the radio network temporary identifier for scrambling the first control information and the second indication information in the first control information, that the first control information is used to schedule the target device;

determining, by the first device based on the radio network temporary identifier for scrambling the first control information and the subframe in which the first control information is located, that the first control information is used to schedule the target device;

determining, by the first device based on the second indication information in the first control information and the subframe in which the first control information is located, that the first control information is used to schedule the target device; or determining, by the first device based on the radio network temporary identifier for scrambling the first control information and the PDCCH that carries the first control information, that the first control information is used to schedule the target device.

7. The method according to claim 6, further comprising:
when the first control information is used to schedule the first-type device, transmitting, by the first device, data based on the first control information.

8. The method according to claim 6, wherein the second information comprises at least one of the following: second indication information included in the first control information, the radio network temporary identifier for scrambling the first control information, the payload size of the first control information, the PDCCH that carries the first control information, and the subframe in which the first control information is located.

9. The method according to claim 6,
wherein the first information is the PDCCH that carries the first control information,
wherein the determining, by the first device based on the first information, that the first control information is used to schedule the first-type device or the second-type device comprises determining, by the first device based on a mapping relationship between a PDCCH that carries control information and a device type, a target device type corresponding to the PDCCH that carries the first control information, and determining that the first control information is used to schedule a type of device indicated by the target device type, and
wherein the device type comprises the first-type device and the second-type device.

10. The method according to claim 6,
wherein the first information is the subframe in which the first control information is located,
wherein the determining, by the first device based on the first information, that the first control information is used to schedule the first-type device or the second-type device comprises determining, by the first device based on a mapping relationship between a subframe in which control information is located and a device type, a target device type corresponding to the subframe in which the first control information is located, and determining that the first control information is used to schedule a type of device indicated by the target device type, and
wherein the device type comprises the first-type device and the second-type device.

11. A first device, comprising:
at least one processor; and
a memory coupled to the at least one processor and configured to store programming instructions that, when executed by the at least one processor, cause the apparatus to perform operations comprising:
receiving first control information sent by a network device;
determining, based on first information, that the first control information is used to schedule a target device, wherein the target device is one of the following devices: the first device and at least one second device, the at least one second device communicates with the network device by using the first device, and the first information comprises at least one of the following: the first control information, a radio network temporary identifier for scrambling the first control information, a payload size of the first control information, a physical downlink control channel (PDCCH) that carries the first control information, and a subframe in which the first control information is located; and when the target device is one of the at least one second device, determining second control information based on resource information that is used for data transmission and that is included in the first control information, and sending the second control information to the target device, so that the target device transmits data based on the second control information, or when the target device is the first device, transmitting data based on the first control information, wherein the first control information comprises second indication information, and wherein the determining, based on the first information, that the first control information is used to schedule the target device comprises:
determining, based on the radio network temporary identifier for scrambling the first control information and the second indication information in the first control information, that the first control information is used to schedule the target device;
determining, based on the radio network temporary identifier for scrambling the first control information and the subframe in which the first control information is located, that the first control information is used to schedule the target device;
determining, based on the second indication information in the first control information and the subframe in which the first control information is located, that the first control information is used to schedule the target device; or
determining, based on the radio network temporary identifier for scrambling the first control information and the PDCCH that carries the first control information, that the first control information is used to schedule the target device.

12. The first device according to claim 11,
wherein the first control information comprises first indication information, and
wherein the determining, based on the first information, that the first control information is used to schedule the target device comprises determining, based on the first indication information in the first control information, that the first control information is used to schedule the target device.

13. The first device according to claim 11,
wherein the determining, by the first device based on the radio network temporary identifier for scrambling the first control information and the subframe in which the first control information is located, that the first control information is used to schedule the target device comprises determining, based on a mapping relationship between a radio network temporary identifier and a device identity and a mapping relationship between a subframe in which control information is located and a device identity, a target device identity corresponding to both the radio network temporary identifier for scrambling the first control information and the subframe in which the first control information is located, and determining that the first control information is used to schedule a target device indicated by the target device identity, and wherein the device identity comprises an identity of the first device and an identity of each of the at least one second device.

14. The first device according to claim 11, wherein the determining, based on the second indication information in the first control information and the subframe in which the first control information is located, that the first control information is used to schedule the target device comprises determining, based on a mapping relationship between indication information and a device identity and a mapping relationship between a subframe in which control information is located and a device identity, a target device identity corresponding to both the second indication information and the subframe in which the first control information is located, and determining that the first control information is used to schedule a target device indicated by the target device identity, and wherein the device identity comprises an identity of the first device and an identity of each of the at least one second device.

15. The first device according to claim 11, wherein the determining, based on the radio network temporary identifier for scrambling the first control information and the PDCCH that carries the first control information, that the first control information is used to schedule the target device comprises determining, based on a mapping relationship between a radio network temporary identifier and a device identity and a mapping relationship between a PDCCH that carries control information and a device identity, a target device identity corresponding to both the radio network temporary identifier for scrambling the first control information and the PDCCH that carries the first control information, and determining that the first control information is used to schedule a target device indicated by the target device identity, and wherein the device identity comprises an identity of the first device and an identity of each of the at least one second device.

* * * * *